US012810038B2

(12) United States Patent
Ito et al.

(10) Patent No.: US 12,810,038 B2
(45) Date of Patent: Nov. 24, 2026

(54) INFORMATION PROCESSING DEVICE, SYSTEM, METHOD, AND STORAGE MEDIUM FOR SOLVING COMBINATORIAL OPTIMIZATION PROBLEM

(71) Applicants: KABUSHIKI KAISHA TOSHIBA, Tokyo (JP); TOSHIBA DIGITAL SOLUTIONS CORPORATION, Kawasaki (JP)

(72) Inventors: Toru Ito, Kawasaki (JP); Hayato Goto, Kawasaki (JP); Kosuke Tatsumura, Kawasaki (JP); Masaru Suzuki, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 983 days.

(21) Appl. No.: 17/487,719

(22) Filed: Sep. 28, 2021

(65) Prior Publication Data

US 2022/0019715 A1 Jan. 20, 2022

Related U.S. Application Data

(63) Continuation of application No. PCT/JP2020/014633, filed on Mar. 30, 2020.

(30) Foreign Application Priority Data

Mar. 28, 2019 (JP) ................................ 2019-064277

(51) Int. Cl.

| | |
|---|---|
| ***G06F 30/20*** | (2020.01) |
| *G06F 111/04* | (2020.01) |
| *G06F 111/10* | (2020.01) |

(52) U.S. Cl.

CPC .......... *G06F 30/20* (2020.01); *G06F 2111/04* (2020.01); *G06F 2111/10* (2020.01)

(58) Field of Classification Search

CPC . G06F 30/20; G06F 7/57; G06F 17/16; G06F 7/4925; G06F 7/582; G06N 10/60

See application file for complete search history.

(56) References Cited

U.S. PATENT DOCUMENTS

| | | | | |
|---|---|---|---|---|
| 10,250,271 B2 | 4/2019 | Goto | | |
| 2008/0065573 A1* | 3/2008 | Macready ................ | G06N 7/08 706/19 | |

(Continued)

FOREIGN PATENT DOCUMENTS

JP 2017-73106 A 4/2017

OTHER PUBLICATIONS

Bian, Zhengbing, et al. "The Ising model: teaching an old problem new tricks." D-wave systems 2 (2010): 1-32 (Year: 2010).*

(Continued)

*Primary Examiner* — David A Hopkins

(74) *Attorney, Agent, or Firm* — Finnegan, Henderson, Farabow, Garrett & Dunner, LLP

(57) ABSTRACT

An information processing device includes a storage unit and a processing circuit. The storage unit is configured to store a first variable which is an element of a first vector and a second variable which is an element of a second vector. The processing circuit is configured to update the first variable by multiplying the second variable weighted with a first coefficient by a time step and adding the multiplied second variable to the corresponding first variable, update the second variable by weighting the first variable with the time step and a second coefficient, adding the weighted first variable to the corresponding second variable, calculating a problem term using the plurality of first variables, and adding the problem term multiplied by the time step to the second variable, update the time step, and monotonically (Continued)

increase or monotonically decrease the second coefficient depending on the number of updates.

19 Claims, 14 Drawing Sheets

(56) References Cited

U.S. PATENT DOCUMENTS

| | | | | |
|---|---|---|---|---|
| 2019/0087388 | A1* | 3/2019 | Venturelli | G06N 10/00 |
| 2019/0266213 | A1* | 8/2019 | Hastings | G06F 17/17 |
| 2020/0401650 | A1* | 12/2020 | Chen | G06N 5/02 |
| 2021/0150400 | A1* | 5/2021 | Pistoia | G06N 10/00 |
| 2022/0012017 | A1* | 1/2022 | Suzuki | G06F 17/11 |
| 2022/0012306 | A1* | 1/2022 | Suzuki | G06N 7/01 |
| 2022/0012307 | A1* | 1/2022 | Suzuki | G06F 17/13 |
| 2022/0019715 | A1* | 1/2022 | Ito | G06N 7/01 |

OTHER PUBLICATIONS

Chapuis, Guillaume, et al. "Finding maximum cliques on a quantum annealer." Proceedings of the Computing Frontiers Conference. 2017. (Year: 2017).*

Djidjev, Hristo N., et al. "Efficient combinatorial optimization using quantum annealing." arXiv preprint arXiv:1801.08653 (2018). (Year: 2018).*

Haribara, Yoshitaka. "Realization and Evaluation of Measurement Feedback Coherent Ising Machines for Combinatorial Optimization Problems." U. Tokyo dissertation (2017). (Year: 2017).*

Lawrence Livermore National Laboratory, "Introduction to Parallel Computing Tutorial", accessed on Jul. 19, 2024, URL: hpc(dot)llnl(dot)gov/documentation/tutorials/introduction-parallel-computing-tutorial (Year: 2024).*

Nvidia, "MPI Solutions for GPUs", accessed via WayBack Machine, archive Date Feb. 15, 2019, URL: developer(dot)nvidia(dot)com/mpi-solutions-gpus (Year: 2019).*

Parekh, Ojas, et al. "Benchmarking adiabatic quantum optimization for complex network analysis." arXiv preprint arXiv: 1604.00319 (2016). (Year: 2016).*

Venturelli, Davide, et al. "Quantum optimization of fully connected spin glasses." Physical Review X 5.3 (2015): 031040 (Year: 2015).*

Vyskocil, Tomas, and Hristo Djidjev. "Simple constraint embedding for quantum annealers." 2018 IEEE International Conference on Rebooting Computing (ICRC). IEEE, 2018 (Year: 2018).*

Zahedinejad, Ehsan, and Arman Zaribafiyan. "Combinatorial optimization on gate model quantum computers: A survey." arXiv preprint arXiv:1708.05294 (2017). (Year: 2017).*

De Santis, Marianna, et al. "A nonmonotone grasp." Mathematical Programming Computation 8 (2016): 271-309. (Year: 2016).*

Vattulainen, Ilpo. "New tests of random numbers for simulations in physical systems." arXiv preprint cond-mat/9411062 (1994). (Year: 1994).*

Binder, K. (2017). Monte Carlo Simulations in Statistical Physics. In: Meyers, R. (eds) Encyclopedia of Complexity and Systems Science. Springer, Berlin, Heidelberg. Glossary: "Random No. generator (RNG)" (Year: 2017).*

Goto, Hayato, Kosuke Tatsumura, and Alexander R. Dixon. "Combinatorial optimization by simulating adiabatic bifurcations in nonlinear Hamiltonian systems." Science advances 5.4 (2019): eaav2372. Abstract, pp. 1-4 (Year: 2019).*

Goto, Hayato. "Bifurcation-based adiabatic quantum computation with a nonlinear oscillator network." Scientific reports 6.1 (2016): 21686. Abstract, pp. 1-6 (Year: 2016).*

Bagnoli, Franco, and Raúl Rechtman. "Stochastic bifurcations in the nonlinear parallel Ising model." Physical Review E 94.5 (2016): 052111. Abstract, pp. 1-4 (Year: 2016).*

Ralphs, Ted, et al. "Parallel solvers for mixed integer linear optimization." Handbook of parallel constraint reasoning (2018): 283-336 (Year: 2018).*

Pabolu, Sivakumar V. "A Distributed Simulated Annealing framework for Engineering Optimization." (2003). (Year: 2003).*

Calégari, Patrice Roger. Parallelization of population-based evolutionary algorithms for combinatorial optimization problems. No. 2046. EPFL, 1999 (Year: 1999).*

Wang, Z. G., et al. "Optimization of multi-pass milling using parallel genetic algorithm and parallel genetic simulated annealing." International Journal of Machine Tools and Manufacture 45.15 (2005) (Year: 2005).*

Bendjoudi, Ahcene, Nordine Melab, and El-Ghazali Talbi. "An adaptive hierarchical master-worker (AHMW) framework for grids—Application to B&B algorithms." Journal of Parallel and Distributed Computing 72.2 (2012): 120-131 (Year: 2012).*

Holmqvist, K., Athanasios Migdalas, and Panos M. Pardalos. "Parallelized heuristics for combinatorial search." Parallel computing in optimization (1997): (Year: 1997).*

Voltaire, "Host Channel Adapters (HCAs)", Copyright 2009, URL: cw(dot)infinibandta(dot)org/files/showcase_product/090726(dot)192240(dot)411(dot)HCA-DS-WEB-052709(dot)pdf (Year: 2009).*

Liu, Jiuxing, et al. "MPI over InfiniBand: Early experiences." Ohio State University Technical Report (2003). (Year: 2003).*

Hayato Goto et al., "Combinatorial optimization by simulating adiabatic bifurcations in nonlinear Hamiltonian systems," Science Advances, vol. 5, No. 4, eaav2372, 9 pages (Apr. 19, 2019).

Hayato Goto, "Bifurcation-based adiabatic quantum computation with a nonlinear oscillator network," Scientific Reports, vol. 6, 21686, doi:10.1038/srep21686, 8 pages (Feb. 22, 2016).

Kazuo Tsuchiya et al., "An Algorithm for a Combinatorial Optimization Problem based on Bifurcation Characteristics," Dept. of Aeronautics and Astronautics, Graduate School of Engineering, Kyoto University, http://www.ynl.t.u-tokyo.ac.jp/project/RobotBrainCREST/publications/pdf/tsuchiya/4_01.pdf, 6 pages, and translation, 6 pages.

Kazuo Tsuchiya et al., "An Algorithm for a Combinatorial Optimization Problem based on Bifurcation Characteristics—Analysis of a Deterministic Annealing Algorithm-," Dept. of Aeronautics and Astronautics, Graduate School of Engineering, Kyoto University, URL:http://www.ynl.t.u-tokyo.ac.jp/project/RobotBrainCREST/publications/pdf/tsuchiya/4_02.pdf, 6 pages, and translation, 6 pages.

* cited by examiner

```
// global variables
a = - 0.4
b = + 1.0
dt0 = 1*10^(-1)
thres = dt0 * 10^(-4)

// time evolution
t_evolution(x, y, dt) {
    x += dt / 2 * y
    y -= dt * (a*x + b*x^3)
    x += dt / 2 * y
    return x,y
}

// generate candidate  dt
generate_dt(x, y) {
    return dt0 /(abs(a)+abs(b)*x^2)
}

// calculates time-symmetric dt
// by using xi and yi
symmetric_dt(x1, y1) {
    dt1 = generate_dt(x1, y1)
    dt2 = generate_dt(x1, y1)
    for (i=0; i<5; i++) {
        x2, y2 = t_evolution(x1, y1, (dt1+dt2)/2)
        _dt = generate_dt(x2, y2)
        if (abs(dt2 - _dt) < thres) { break }
        else { dt2 = _dt)
    }
    return x2, y2, (dt1+dt2)/2
}

x, y, dt = symmetric_dt(1, 0)
```

FIG. 10

INFORMATION PROCESSING DEVICE, SYSTEM, METHOD, AND STORAGE MEDIUM FOR SOLVING COMBINATORIAL OPTIMIZATION PROBLEM

CROSS REFERENCE TO RELATED APPLICATION

This application is continuation application of International Application No. JP2020/014633, filed on Mar. 30, 2020, which claims priority to Japanese Patent Application No. 2019-064277, filed on Mar. 28, 2019, the entire contents of which are incorporated herein by reference.

FIELD

Embodiments of the present invention relate to an information processing device, an information processing system, an information processing method, and a storage medium.

BACKGROUND

A combinatorial optimization problem is a problem of selecting a combination most suitable for a purpose from a plurality of combinations. Mathematically, combinatorial optimization problems are attributed to problems for maximizing functions including a plurality of discrete variables, called "objective functions", or minimizing the functions. Although combinatorial optimization problems are common problems in various fields including finance, logistics, transport, design, manufacture, and life science, it is not always possible to calculate an optimal solution due to so-called "combinatorial explosion" that the number of combinations increases in exponential orders of a problem size. In addition, it is difficult to even obtain an approximate solution close to the optimal solution in many cases.

Development of a technique for calculating a solution for the combinatorial optimization problem with high accuracy is required in order to solve problems in each field and promote social innovation and progress in science and technology.

BRIEF DESCRIPTION OF DRAWINGS

FIG. 10 is a diagram illustrating an example of an algorithm for calculating a time-reversal symmetric variable time step using a pseudo code.

DETAILED DESCRIPTION

According to one embodiment, an information processing device includes a storage unit and a processing circuit. The storage unit is configured to store a first variable which is an element of a first vector and a second variable which is an element of a second vector. The processing circuit is configured to update the first variable by multiplying the second variable weighted with a first coefficient by a time step and adding the multiplied second variable to the corresponding first variable, update the second variable by weighting the first variable with the time step and a second coefficient, adding the weighted first variable to the corresponding second variable, calculating a problem term using the plurality of first variables, and adding the problem term multiplied by the time step to the second variable, update the time step, and monotonically increase or monotonically decrease the second coefficient depending on the number of updates.

Hereinafter, embodiments of the present invention will be described with reference to the drawings. In addition, the same components will be denoted by the same reference signs, and a description thereof will be omitted as appropriate.

Figure 1:
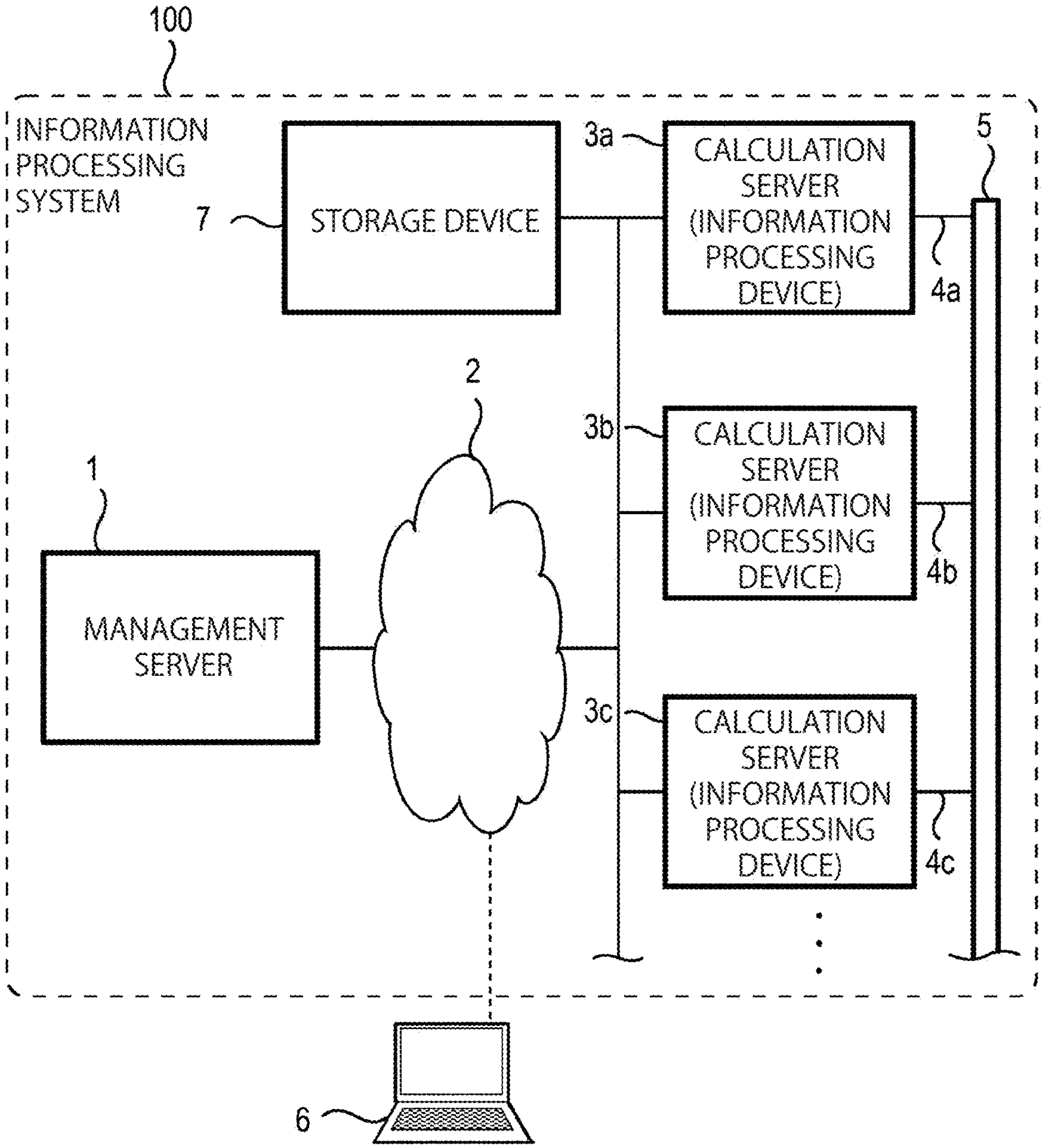
FIG. 1 is a diagram illustrating a configuration example of an information processing system.

FIG. 1 is a block diagram illustrating a configuration example of an information processing system 100. The information processing system 100 of FIG. 1 includes a management server 1, a network 2, calculation servers (information processing devices) 3*a* to 3*c*, cables 4*a* to 4*c*, a switch 5, and a storage device 7. In addition, FIG. 1 illustrates a client terminal 6 that can communicate with the information processing system 100. The management server 1, the calculation servers 3*a* to 3*c*, the client terminal 6, and the storage device 7 can perform data communication with each other via the network 2. For example, the calculation servers 3*a* to 3*c* can store data in the storage device 7 and read data from the storage device 7. The network 2 is, for example, the Internet in which a plurality of computer networks are connected to each other. The network 2 can use a wired or wireless communication medium or a combination thereof. In addition, an example of a communication protocol used in the network 2 is TCP/IP, but a type of communication protocol is not particularly limited.

In addition, the calculation servers 3*a* to 3*c* are connected to the switch 5 via the cables 4*a* to 4*c*, respectively. The cables 4*a* to 4*c* and the switch 5 form interconnection between the calculation servers. The calculation servers 3*a* to 3*c* can also perform data communication with each other via the interconnection. The switch 5 is, for example, an Infiniband switch. The cables 4*a* to 4*c* are, for example, Infiniband cables. However, a wired LAN switch/cable may be used instead of the Infiniband switch/cable. Communication standards and communication protocols used in the cables 4*a* to 4*c* and the switch 5 are not particularly limited.

Examples of the client terminal 6 include a notebook PC, a desktop PC, a smartphone, a tablet, and an in-vehicle terminal.

Parallel processing and/or distributed processing can be performed to solve a combinatorial optimization problem. Therefore, the calculation servers 3*a* to 3*c* and/or processors of the calculation servers 3*a* to 3*c* may share and execute some steps of calculation processes, or may execute similar calculation processes for different variables in parallel. For example, the management server 1 converts a combinatorial optimization problem input by a user into a format that can be processed by each calculation server, and controls the calculation server. Then, the management server 1 acquires calculation results from the respective calculation servers, and converts the aggregated calculation result into a solution of the combinatorial optimization problem. In this manner, the user can obtain the solution to the combinatorial optimization problem. It is assumed that the solution of the combinatorial optimization problem includes an optimal solution and an approximate solution close to the optimal solution.

FIG. 1 illustrates three calculation servers. However, the number of calculation servers included in the information processing system is not limited. In addition, the number of calculation servers used for solving the combinatorial optimization problem is not particularly limited. For example, the information processing system may include one calculation server. In addition, a combinatorial optimization problem may be solved using any one of a plurality of calculation servers included in the information processing system. In addition, the information processing system may include several hundred or more calculation servers. The calculation server may be a server installed in a data center or a desktop PC installed in an office. In addition, the calculation server may be a plurality of types of computers installed at different locations. A type of information processing device used as the calculation server is not particularly limited. For example, the calculation server may be a general-purpose computer, a dedicated electronic circuit, or a combination thereof.

Figure 2:
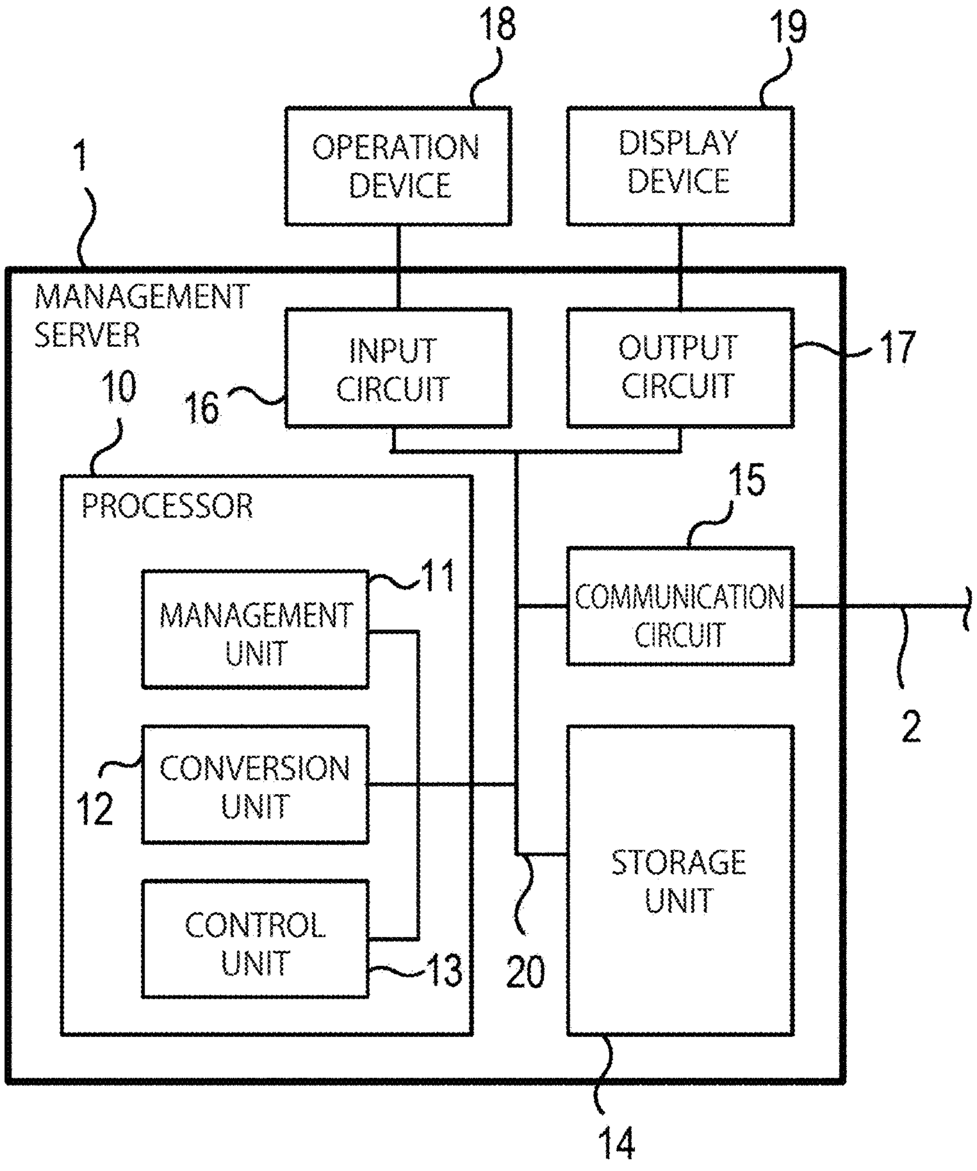
FIG. 2 is a block diagram illustrating a configuration example of a management server.

FIG. 2 is a block diagram illustrating a configuration example of the management server 1. The management server 1 of FIG. 2 is, for example, a computer including a central processing unit (CPU) and a memory. The management server 1 includes a processor 10, a storage unit 14, a communication circuit 15, an input circuit 16, and an output circuit 17. It is assumed that the processor 10, the storage unit 14, the communication circuit 15, the input circuit 16, and the output circuit 17 are connected to each other via a bus 20. The processor 10 includes a management unit 11, a conversion unit 12, and a control unit 13 as internal components.

The processor 10 is an electronic circuit that executes an operation and controls the management server 1. The processor 10 is an example of a processing circuit. As the processor 10, for example, a CPU, a microprocessor, an ASIC, an FPGA, a PLD, or a combination thereof can be used. The management unit 11 provides an interface configured to operate the management server 1 via the client terminal 6 of the user. Examples of the interface provided by the management unit 11 include an API, a CLI, and a web page. For example, the user can input information of a combinatorial optimization problem via the management unit 11, and browse and/or download a calculated solution of the combinatorial optimization problem. The conversion unit 12 converts the combinatorial optimization problem into a format that can be processed by each calculation server. The control unit 13 transmits a control command to each calculation server. After the control unit 13 acquires calculation results from the respective calculation servers, the conversion unit 12 aggregates the plurality of calculation results and converts the aggregated result into a solution of the combinatorial optimization problem. In addition, the control unit 13 may designate a processing content to be executed by each calculation server or a processor in each server.

The storage unit 14 stores various types of data including a program of the management server 1, data necessary for execution of the program, and data generated by the program. Here, the program includes both an OS and an application. The storage unit 14 may be a volatile memory, a non-volatile memory, or a combination thereof. Examples of the volatile memory include a DRAM and an SRAM. Examples of the non-volatile memory include a NAND flash memory, a NOR flash memory, a ReRAM, or an MRAM. In addition, a hard disk, an optical disk, a magnetic tape, or an external storage device may be used as the storage unit 14.

The communication circuit 15 transmits and receives data to and from each device connected to the network 2. The communication circuit 15 is, for example, a network interface card (NIC) of a wired LAN. However, the communication circuit 15 may be another type of communication circuit such as a wireless LAN. The input circuit 16 implements data input with respect to the management server 1. It is assumed that the input circuit 16 includes, for example, a USB, PCI-Express, or the like as an external port. In the example of FIG. 2, an operation device 18 is connected to the input circuit 16. The operation device 18 is a device configured to input information to the management server 1. The operation device 18 is, for example, a keyboard, a mouse, a touch panel, a voice recognition device, or the like, but is not limited thereto. The output circuit 17 implements data output from the management server 1. It is assumed that the output circuit 17 includes HDMI, DisplayPort, or the like as an external port. In the example of FIG. 2, the display device 19 is connected to the output circuit 17. Examples of the display device 19 include a liquid crystal display (LCD), an organic electroluminescence (EL) display, and a projector, but are not limited thereto.

An administrator of the management server 1 can perform maintenance of the management server 1 using the operation device 18 and the display device 19. Note that the operation device 18 and the display device 19 may be incorporated in the management server 1. In addition, the operation device 18 and the display device 19 are not necessarily connected to the management server 1. For example, the administrator may perform maintenance of the management server 1 using an information terminal capable of communicating with the network 2.

Figure 3:
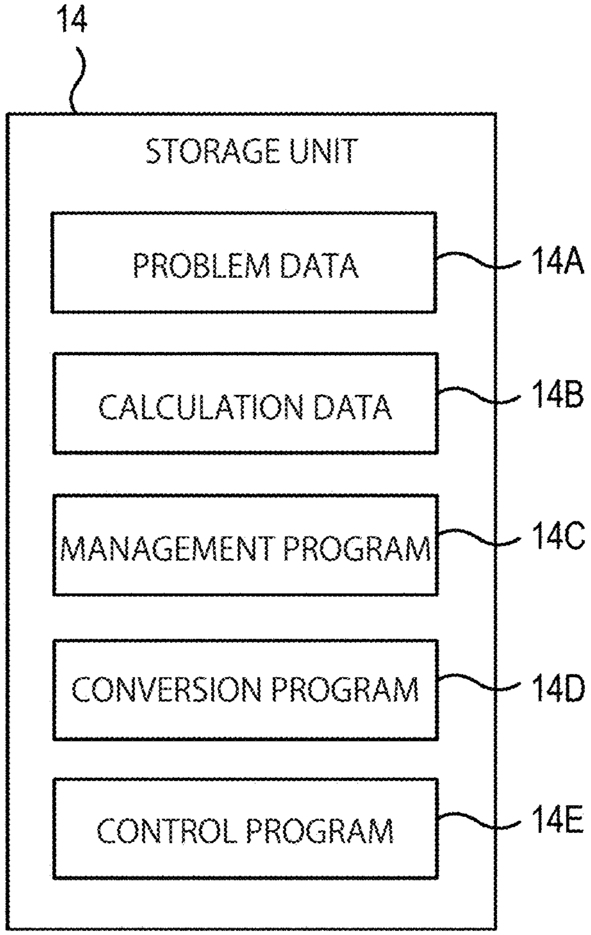
FIG. 3 is a diagram illustrating an example of data stored in a storage unit of the management server.

FIG. 3 illustrates an example of data stored in the storage unit 14 of the management server 1. The storage unit 14 of FIG. 3 stores problem data 14A, calculation data 14B, a management program 14C, a conversion program 14D, and a control program 14E. For example, the problem data 14A includes data of a combinatorial optimization problem. For example, the calculation data 14B includes a calculation result collected from each calculation server. For example, the management program 14C is a program that implements the above-described function of the management unit 11. For example, the conversion program 14D is a program that implements the above-described function of the conversion unit 12. For example, the control program 14E is a program that implements the above-described function of the control unit 13.

Figure 4:
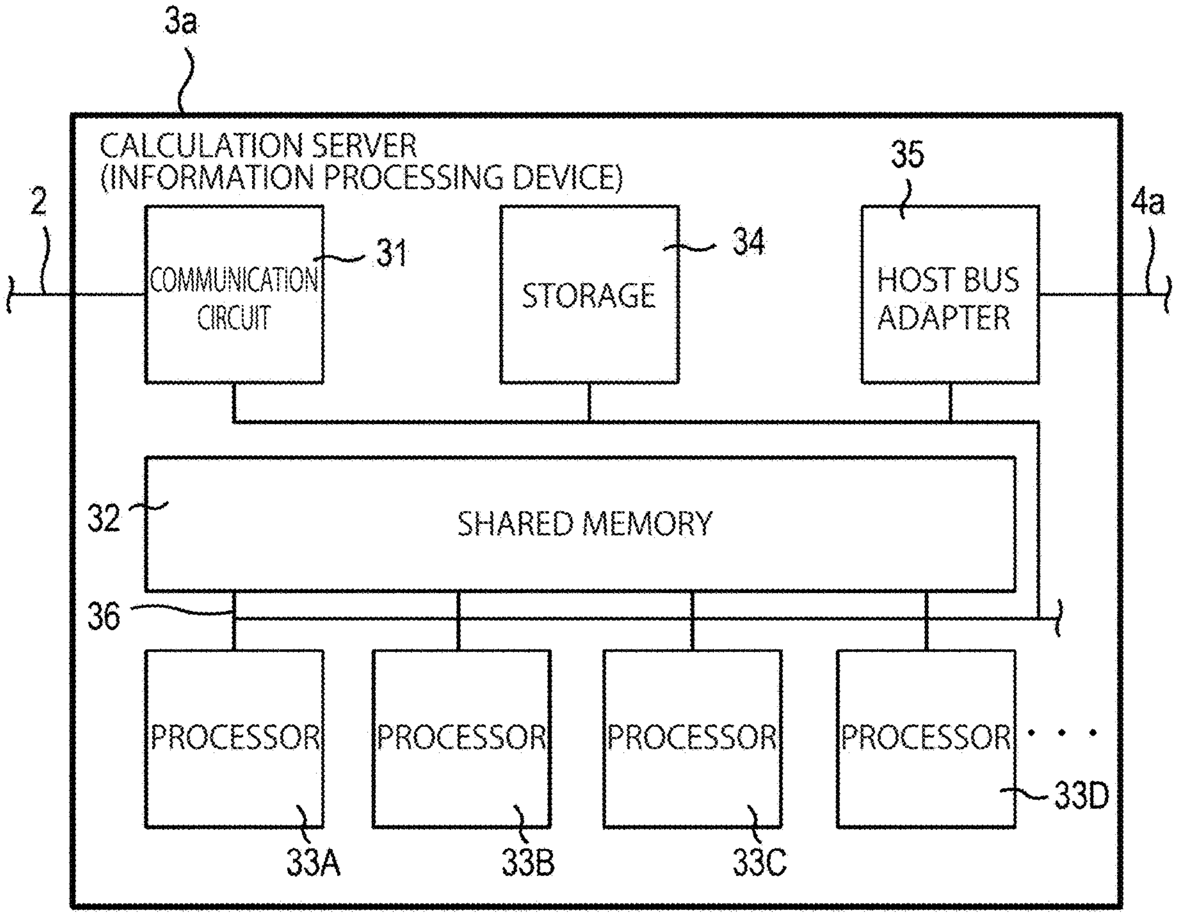
FIG. 4 is a block diagram illustrating a configuration example of a calculation server.

FIG. 4 is a block diagram illustrating a configuration example of the calculation server. The calculation server in FIG. 4 is, for example, an information processing device that calculates a first vector and a second vector alone or in a shared manner with another calculation server.

FIG. 4 illustrates a configuration of the calculation server 3*a* as an example. The other calculation server may have a configuration similar to that of the calculation server 3*a* or may have a configuration different from that of the calculation server 3*a*.

The calculation server 3*a* includes, for example, a communication circuit 31, a shared memory 32, processors 33A to 33D, a storage 34, and a host bus adapter 35. It is assumed that the communication circuit 31, the shared memory 32, the processors 33A to 33D, the storage 34, and the host bus adapter 35 are connected to each other via a bus 36.

The communication circuit 31 transmits and receives data to and from each device connected to the network 2. The communication circuit 31 is, for example, a network interface card (NIC) of a wired LAN. However, the communication circuit 31 may be another type of communication circuit such as a wireless LAN. The shared memory 32 is a memory accessible from the processors 33A to 33D. Examples of the shared memory 32 include a volatile memory such as a DRAM and an SRAM. However, another type of memory such as a non-volatile memory may be used as the shared memory 32. The shared memory 32 may be configured to store, for example, the first vector and the second vector. The processors 33A to 33D can share data via the shared memory 32. Note that all the memories of the calculation server 3*a* are not necessarily configured as shared memories. For example, some of the memories of the calculation server 3*a* may be configured as a local memory that can be accessed only by any processor. Note that the shared memory 32 and the storage 34 to be described later are examples of a storage unit of the information processing device.

The processors 33A to 33D are electronic circuits that execute calculation processes. The processor may be, for example, any of a central processing unit (CPU), a graphics processing unit (GPU), a field-programmable gate array (FPGA), and an application specific integrated circuit (ASIC), or a combination thereof. In addition, the processor may be a CPU core or a CPU thread. When the processor is the CPU, the number of sockets included in the calculation server 3*a* is not particularly limited. In addition, the processor may be connected to another component of the calculation server 3*a* via a bus such as PCI express.

In the example of FIG. 4, the calculation server includes four processors. However, the number of processors included in one calculation server may be different from this. For example, the number and/or types of processors implemented on the calculation server may be different. Here, the processor is an example of a processing circuit of the information processing device. The information processing device may include a plurality of processing circuits.

For example, the information processing device is configured to repeatedly update the first vector which has a first variable $x_i$ (i=1, 2, . . . , N) as an element and the second vector which has a second variable $y_i$ (i=1, 2, . . . , N) corresponding to the first variable as an element. The storage unit of the information processing device may be configured to store a first variable which is an element of a first vector and a second variable which is an element of a second vector.

For example, the processing circuit of the information processing device is configured to update the first variable by multiplying the second variable weighted with a first coefficient by a time step and adding the multiplied second variable to the corresponding first variable; update the second variable by weighting the first variable with the time step and a second coefficient, adding the weighted first variable to the corresponding second variable, calculating a problem term using the plurality of first variables, and adding the problem term multiplied by the time step to the second variable; update the time step; and monotonically increase or monotonically decrease the second coefficient depending on the number of updates. The problem term may be calculated based on an Ising model. In addition, the problem term may include a many-body interaction. Details of the first coefficient, the second coefficient, the problem term, the Ising model, and the many-body interaction will be described later.

In the information processing device, for example, a processing content (task) can be allocated in units of processors. However, a unit of a calculation resource in which the processing content is allocated is not limited. For example, the processing content may be allocated in units of calculators, or the processing content may be allocated in units of processes operating on a processor or in units of CPU threads.

Hereinafter, components of the calculation server will be described with reference to FIG. 4 again.

The storage 34 stores various data including a program of the calculation server 3*a*, data necessary for executing the program, and data generated by the program. Here, the program includes both an OS and an application. The storage 34 may be configured to store, for example, the first vector and the second vector. The storage 34 may be a volatile memory, a non-volatile memory, or a combination thereof. Examples of the volatile memory include a DRAM and an SRAM. Examples of the non-volatile memory include a NAND flash memory, a NOR flash memory, a ReRAM, or an MRAM. In addition, a hard disk, an optical disk, a magnetic tape, or an external storage device may be used as the storage 34.

The host bus adapter 35 implements data communication between the calculation servers. The host bus adapter 35 is connected to the switch 5 via the cable 4*a*. The host bus adapter 35 is, for example, a host channel adaptor (HCA). The speed of parallel calculation processes can be improved by forming interconnection capable of achieving a high throughput using the host bus adapter 35, the cable 4*a*, and the switch 5.

Figure 5:
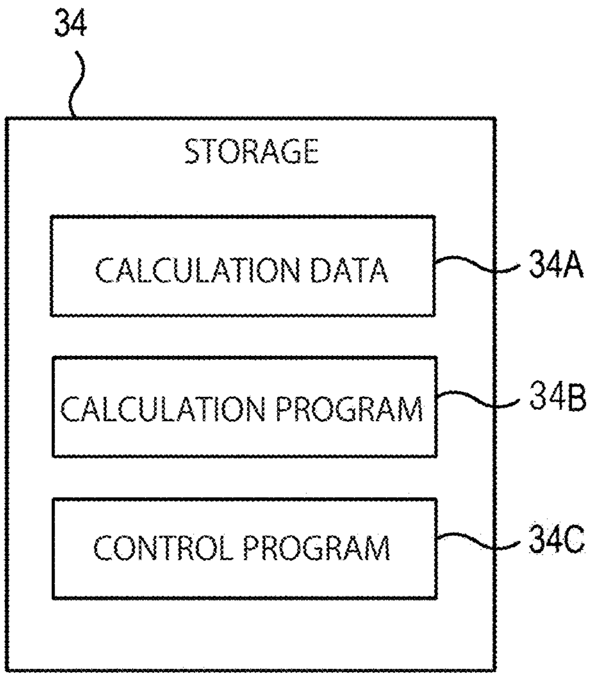
FIG. 5 is a diagram illustrating an example of data stored in a storage of the calculation server.

FIG. 5 illustrates an example of data stored in the storage of the calculation server. The storage 34 of FIG. 5 stores calculation data 34A, a calculation program 34B, and a control program 34C. The calculation data 34A includes data in the middle of calculation by the calculation server 3*a* or a calculation result. Note that at least a part of the calculation data 34A may be stored in a different storage hierarchy such as the shared memory 32, a cache of the processor, and a register of the processor. The calculation program 34B is a program that implements a calculation process in each processor and a process of storing data in the shared memory 32 and the storage 34 based on a predetermined algorithm. The control program 34C is a program that controls the calculation server 3*a* based on a command transmitted from the control unit 13 of the management server 1 and transmits a calculation result of the calculation server 3*a* to the management server 1.

Next, a technique related to solving a combinatorial optimization problem will be described. An example of the information processing device used to solve the combinatorial optimization problem is an Ising machine. The Ising machine refers to an information processing device that calculates the energy of a ground state of an Ising model. Hitherto, the Ising model has been mainly used as a model of a ferromagnet or a phase transition phenomenon in many cases. In recent years, however, the Ising model has been increasingly used as a model for solving a combinatorial optimization problem. The following Formula (1) represents the energy of the Ising model.

[Formula 1]

$$E_{Ising} = \sum_{i=1}^{N} h_i s_i + \frac{1}{2}\sum_{i=1}^{N}\sum_{j=1}^{N} J_{i,j} s_i s_j \quad (1)$$

Here, $s_i$ and $s_j$ are spins, and the spins are binary variables each having a value of either +1 or −1. N is the number of spins. Further, $h_i$ is a local magnetic field acting on each spin. J is a matrix of coupling coefficients between spins. The matrix J is a real symmetric matrix whose diagonal components are 0. Therefore, $J_{ij}$ indicates an element in row i and column j of the matrix J. Note that the Ising model of Formula (1) is a quadratic expression for the spin, an extended Ising model (Ising model having a many-body interaction) including a third-order or higher-order term of the spin may be used as will be described later.

When the Ising model of Formula (1) is used, energy $E_{Ising}$ can be used as an objective function, and it is possible to calculate a solution that minimizes energy $E_{Ising}$ as much as possible. The solution of the Ising model is expressed in a format of a spin vector $(s_1, s_2, \ldots, s_N)$. This vector is referred to as a solution vector. In particular, the vector $(s_1, s_2, \ldots, s_N)$ having the minimum value of the energy $E_{Ising}$ is referred to as an optimal solution. However, the solution of the Ising model to be calculated is not necessarily a strictly optimal solution. Hereinafter, a problem of obtaining an approximate solution (that is, an approximate solution in which a value of the objective function is as close as possible to the optimal value) in which the energy $E_{Ising}$ is minimized as much as possible using the Ising model is referred to as an Ising problem.

Since the spin $s_i$ in Formula (1) is a binary variable, conversion with a discrete variable (bit) used in the combinatorial optimization problem can be easily performed using Formula $(1+s_i)/2$. Therefore, it is possible to obtain a solution of the combinatorial optimization problem by converting the combinatorial optimization problem into the Ising problem and causing the Ising machine to perform calculation. A problem of obtaining a solution that minimizes a quadratic objective function having a discrete variable (bit), which takes a value of either 0 or 1, as a variable is referred to as a quadratic unconstrained binary optimization (QUBO) problem. It can be said that the Ising problem represented by Formula (1) is equivalent to the QUBO problem.

For example, a quantum annealer, a coherent Ising machine, a quantum bifurcation machine have been proposed as hardware implementations of the Ising Machine. The quantum annealer implements quantum annealing using a superconducting circuit. The coherent Ising machine uses an oscillation phenomenon of a network formed by an optical parametric oscillator. The quantum bifurcation machine uses a quantum mechanical bifurcation phenomenon in a network of a parametric oscillator with the Kerr effect. These hardware implementations have the possibility of significantly reducing a calculation time, but also have a problem that it is difficult to achieve scale-out and a stable operation.

Therefore, it is also possible to solve the Ising problem using a widely-spread digital computer. As compared with the hardware implementations using the above-described physical phenomenon, the digital computer facilitates the scale-out and the stable operation. An example of an algorithm for solving the Ising problem in the digital computer is simulated annealing (SA). A technique for performing simulated annealing at a higher speed has been developed. However, general simulated annealing is a sequential updating algorithm where each of variables is updated sequentially, and thus, it is difficult to speed up calculation processes by parallelization.

Taking the above-described problem into consideration, a simulated bifurcation algorithm, capable of solving a large-scale combinatorial optimization problem at a high speed by parallel calculation in the digital computer, has been proposed. Hereinafter, a description will be given regarding an information processing device, an information processing system, an information processing method, a storage medium, and a program for solving a combinatorial optimization problem using the simulated bifurcation algorithm.

First, an overview of the simulated bifurcation algorithm will be described.

In the simulated bifurcation algorithm, a simultaneous ordinary differential equation in (2) below is numerically solved for each of two variables $x_i$ and $y_i$ $(i=1, 2, \ldots, N)$, the number of each of the variables being N. Each of the N variables $x_i$ corresponds to the spin $s_i$ of the Ising model. On the other hand, each of the N variables $y_i$ corresponds to the momentum. It is assumed that both the variables $x_i$ and $y_i$ are continuous variables. Hereinafter, a vector having the variable $x_i$ $(i=1, 2, \ldots, N)$ as an element is referred to as a first vector, and a vector having the variable $y_i$ $(i=1, 2, \ldots, N)$ as an element is referred to as a second vector.

[Formula 2]

$$\frac{dx_i}{dt} = \frac{\partial H}{\partial y_i} = Dy_i \quad (2)$$

$$\frac{dy_i}{dt} = -\frac{\partial H}{\partial x_i} = \{-D + p(t) - Kx_i^2\} \propto_i - ch_i a(t) - c\sum_{j=1}^{N} J_{ij} x_j$$

Here, H is a Hamiltonian of the following Formula (3).

[Formula 3]

$$H = \sum_{i=1}^{N}\left[\frac{D}{2}(x_i^2 + y_i^2) - \frac{p(t)}{2}x_i^2 + \frac{K}{4}x_i^4 + ch_i x_i a(t) + \frac{c}{2}\sum_{j=1}^{N} J_{ij} x_i x_j\right] \quad (3)$$

Note that, in (2), a Hamiltonian H' including a term $G(x_1, x_2, \ldots, x_N)$ expressed in the following Formula (4) may be used instead of the Hamiltonian H of Formula (3). A function including not only the Hamiltonian H but also the term $G(x_1, x_2, \ldots, x_N)$ is referred to as an extended Hamiltonian to be distinguished from the original Hamiltonian H.

[Formula 4]

$$H' = \sum_{i=1}^{N}\left[\frac{D}{2}(x_i^2 + y_i^2) - \frac{p(t)}{2}x_i^2 + \frac{K}{4}x_i^4 + ch_i x_i a(t) + \frac{c}{2}\sum_{j=1}^{N} J_{ij}x_i x_j\right] + G(x_1, x_2, \ldots, x_N) \tag{4}$$

Hereinafter, processing will be described by taking a case where the term G $(x_1, x_2, \ldots, x_N)$ is a correction term as an example. However, the term G $(x_1, x_2, \ldots, x_N)$ may be derived from a constraint condition of a combinatorial optimization problem. However, a deriving method and a type of the term G $(x_1, x_2, \ldots, x_N)$ are not limited. In addition, the term G $(x_1, x_2, \ldots, x_N)$ is added to the original Hamiltonian H in Formula (4). However, the term G $(x_1, x_2, \ldots, x_N)$ may be incorporated into the extended Hamiltonian using a different method.

Referring to the Hamiltonian of Formula (3) and the extended Hamiltonian of Formula (4), each term is either the element $x_i$ of the first vector or the element $y_i$ of the second vector. As expressed in the following Formula (5), an extended Hamiltonian that can be divided into a term U of the element $x_i$ of the first vector and a term V of the element $y_i$ of the second vector may be used.

[Formula 5]

$$H' = U(x_1, \ldots, x_N) + V(y_1, \ldots, y_N) \tag{5}$$

In calculation of time evolution of the simulated bifurcation algorithm, values of the variables $x_i$ and $y_i$ (i=1, 2, . . . , N) are repeatedly updated. Then, the spin $s_i$ (i=1, 2, . . . , N) of the Ising model can be obtained by converting the variable $x_i$ when a predetermined condition is satisfied. Hereinafter, processing will be described assuming a case where the time evolution is calculated. However, the simulated bifurcation algorithm may be calculated using a scheme other than the time evolution.

In (2) and (3), a coefficient D corresponds to the above-described first coefficient, and is also referred to as detuning. A coefficient p(t) corresponds to the above-described second coefficient and is also referred to as a pumping amplitude. In the calculation of the time evolution, a value of the coefficient p(t) can be monotonically increased depending on the number of updates. An initial value of the coefficient p(t) may be set to 0.

Note that a case where the second coefficient p(t) is a positive value and a value of the second coefficient p(t) increases depending on the number of updates will be described as an example hereinafter. However, the sign of the algorithm to be presented below may be inverted, and the second coefficient p(t) as a negative value may be used. In this case, the value of the second coefficient p(t) monotonically decreases depending on the number of updates. In either case, however, the absolute value of the second coefficient p(t) monotonically increases depending on the number of updates.

A coefficient K corresponds to a positive Kerr coefficient. As a coefficient c, a constant coefficient can be used. For example, a value of the coefficient c may be determined before execution of calculation according to the simulated bifurcation algorithm. For example, the coefficient c can be set to a value close to an inverse number of the maximum eigenvalue of the $J^{(2)}$ matrix. For example, a value of c=0.5D√(N/2n) can be used. Here, n is the number of edges of a graph related to the combinatorial optimization problem. In addition, a(t) is a coefficient that increases with p(t) at the time of calculating the time evolution. For example, √(p(t)/K) can be used as a(t). Note that the vector $h_i$ of the local magnetic field in (3) and (4) can be omitted.

For example, when the value of the coefficient p(t) exceeds a predetermined value, a solution vector having the spin $s_i$ as an element can be obtained by converting a variable $x_i$, which is a positive value, into +1 and a variable $x_i$, which is a negative value, into −1 in the first vector. This solution vector corresponds to the solution of the Ising problem. Note that it may be determined whether to obtain a solution vector by executing the above-described conversion based on the number of updates of the first vector and the second vector.

In the case of performing the calculation of the simulated bifurcation algorithm, the solution can be performed by converting the above-described (2) into a discrete recurrence formula using the Symplectic Euler method. The following (6) represents an example of the simulated bifurcation algorithm after being converted into the recurrence formula.

[Formula 6]

$$\begin{aligned} x_i(t+\Delta t) &= x_i(t) + Dy_i(t)\Delta t \\ y_i(t+\Delta t) &= y_i(t) + [\{-D + p(t+\Delta t) - Kx_i^2(t+\Delta t)\}x_i(t+\Delta t)]\Delta t \\ &\quad - ch_i a(t+\Delta t)\Delta t - c\Delta t\sum_{j=1}^{N} J_{i,j}x_j(t+\Delta t) \end{aligned} \tag{6}$$

Here, t is time, and Δt is a time step (time increment). Note that the time t and the time step Δt are used to indicate the correspondence relationship with the differential equation in (6). However, the time t and the time step Δt are not necessarily included as explicit parameters when actually implementing the algorithm in software or hardware. For example, if the time step Δt is 1, the time step Δt can be removed from the algorithm at the time of implementation. In a case where the time t is not included as the explicit parameter when the algorithm is implemented, $x_i(t+\Delta t)$ may be interpreted as an updated value of $x_i(t)$ in (4). That is, "t" in the above-described (4) indicates a value of the variable before update, and "t+Δt" indicates a value of the variable after update.

In (6), the term described in the third line is derived from the Ising energy. Since a format of this term is determined depending on a problem to be solved, the term is referred to as a problem term.

In the case of calculating the time evolution of the simulated bifurcation algorithm, the value of the spin $s_i$ can be obtained based on the sign of the variable $x_i$ after increasing the value of p(t) from the initial value (for example, 0) to a predetermined value. For example, if a signum function of $\mathrm{sgn}(x_i)=+1$ when $x_i>0$ and $\mathrm{sgn}(x_i)=-1$ when $x_i<0$ is used, the value of the spin $s_i$ can be obtained by converting the variable $x_i$ with the signum function when the value of p(t) increases to the predetermined value. As the signum function, for example, it is possible to use a function that enables $\mathrm{sgn}(x_i)=x_i/|x_i|$ when $x_i \neq 0$ and $\mathrm{sgn}(x_i)=+1$ or −1 when $x_i=0$. A timing of obtaining the solution (for example, the spin $s_i$ of the Ising model) of the combinatorial optimization problem is not particularly limited. For example, the solution (solution vector) of the combinatorial optimization problem may be obtained when the number of updates of the first vector and the second vector, the value of the second coefficient p, or the value of the objective function becomes larger than a threshold.

Figure 6:
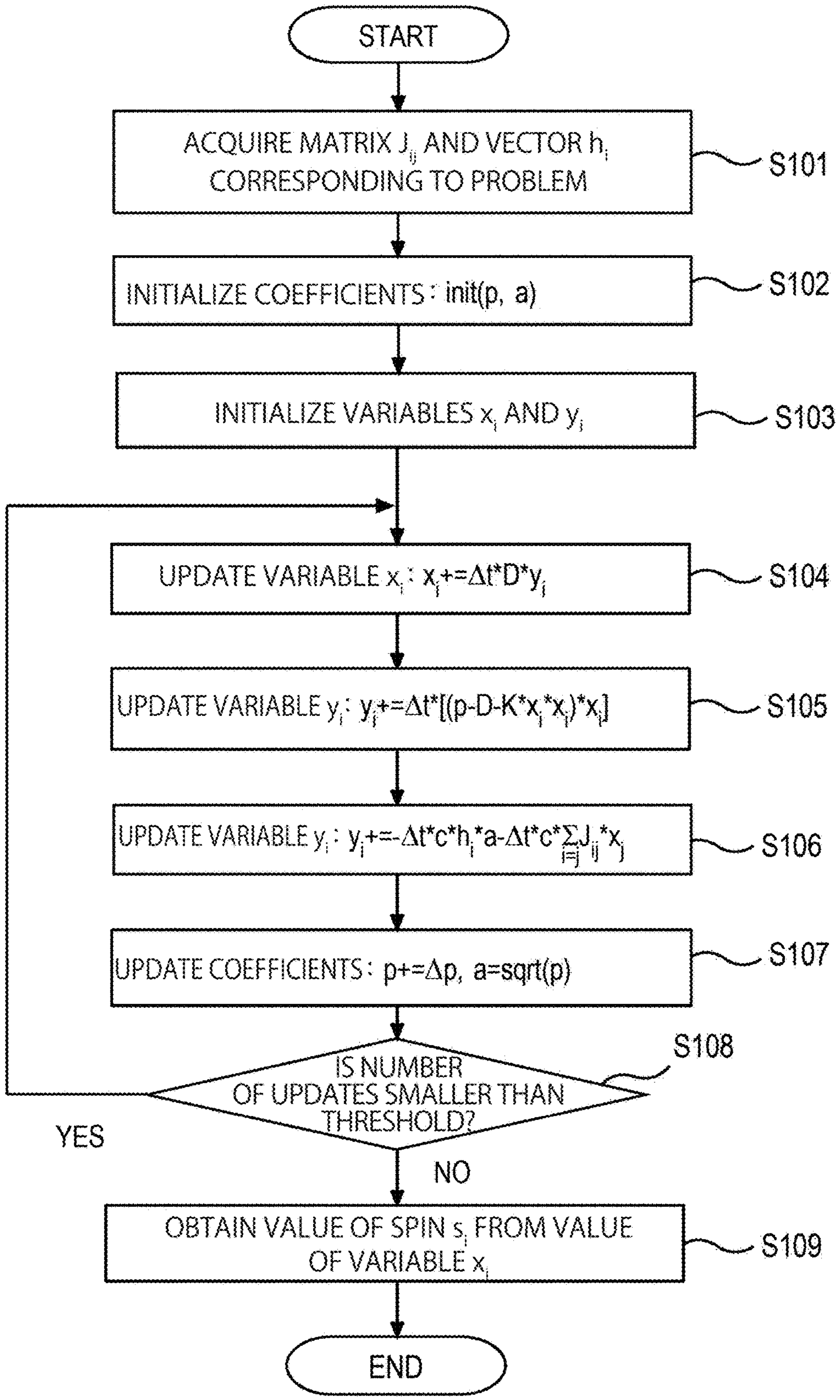
FIG. 6 is a flowchart illustrating an example of processing in a case where a solution of a simulated bifurcation algorithm is calculated by time evolution.

The flowchart of FIG. 6 illustrates an example of processing in the case where the solution of the simulated bifurcation algorithm is calculated by the time evolution. Hereinafter, the processing will be described with reference to FIG. 6.

First, the calculation server acquires the matrix $J_{ij}$ and the vector $h_i$ corresponding to a problem from the management server 1 (step S101). Then, the calculation server initializes the coefficients p(t) and a(t) (step S102). For example, values of the coefficients p and a can be set to 0 in step S102, but the initial values of the coefficients p and a are not limited. Next, the calculation server initializes the first variable $x_i$ and the second variable $y_i$ (step S103). Here, the first variable $x_i$ is an element of the first vector. In addition, the second variable $y_i$ is an element of the second vector. In step S103, the calculation server may initialize $x_i$ and $y_i$ to 0, for example. However, a method for initializing $x_i$ and $y_i$ is not limited. In addition, the first variable $x_i$ or the second variable $y_i$ may be initialized at a timing different from this. In addition, at least one of the variables may be initialized a plurality of times.

Next, the calculation server updates the element $x_i$ of the corresponding first vector based on the element $y_i$ of the second vector (step S104). For example, the calculation server updates the first vector by performing weighted addition of the element $y_i$ of the corresponding second vector to the element $x_i$ of the first vector in step S104. For example, $\Delta t \times D \times y_i$ can be added to the variable $x_i$ in step S104. Then, the calculation server updates the element $y_i$ of the second vector (steps S105 and S106). For example, $\Delta t \times [(p - D - K \times x_i \times x_i) \times x_i]$ can be added to the variable $y_i$ in step S105. In step S106, $-\Delta t \times c \times h_i \times a - \Delta t \times c \times \Sigma J_{ij} x_j$ can be further added to the variable $y_i$.

Next, the calculation server updates the values of the coefficients p and a (step S107). For example, a constant value (Δp) may be added to the coefficient p, and the coefficient a may be set to a positive square root of the updated coefficient p. However, this is merely an example of a method for updating the values of the coefficients p and a as will be described later. Then, the calculation server determines whether the number of updates of the first vector and the second vector is smaller than the threshold (step S108). When the number of updates is smaller than the threshold (YES in step S108), the calculation server executes the processes of steps S104 to S107 again. When the number of updates is equal to or larger than the threshold (NO in step S108), the spin $s_i$, which is the element of the solution vector, is obtained based on the element $x_i$ of the first vector (step S109). In step S109, the solution vector can be obtained, for example, in the first vector by converting the variable $x_i$ which is the positive value into +1 and the variable $x_i$ which is the negative value into −1.

Note that when the number of updates is smaller than the threshold in the determination in step S108 (YES in step S108), a value of the Hamiltonian may be calculated based on the first vector, and the first vector and the value of the Hamiltonian may be stored. As a result, a user can select an approximate solution closest to the optimal solution from the plurality of first vectors.

Note that at least one of the processes illustrated in the flowchart of FIG. 6 may be executed in parallel. For example, at least some processes of steps S104 to S106 may be executed in parallel such that the N elements included in each of the first vector and the second vector are updated in parallel. For example, the processes may be performed in parallel using a plurality of calculation servers. The processes may be performed in parallel by a plurality of processors. However, an implementation for realizing parallelization of the processes and a mode of the parallelization of the processes are not limited.

The execution order of processes of updating the variables $x_i$ and $y_i$ illustrated in steps S105 to S106 described above is merely an example. Therefore, the processes of updating the variables $x_i$ and $y_i$ may be executed in a different order. For example, the order in which the process of updating the variable $x_i$ and the process of updating the variable $y_i$ are executed may be interchanged. In addition, the order of sub-processing included in the process of updating each variable is not limited. For example, the execution order of the addition process for the variable $y_i$ may be different from the example of FIG. 6. The execution order and timing of processing as a precondition for executing the process of updating each variable are also not particularly limited. For example, the calculation process of the problem term may be executed in parallel with other processes including the process of updating the variable $x_i$. The same applies to the processing in each flowchart to be described hereinafter, in that the execution order and timings of the processes of updating the variables $x_i$ and $y_i$, the sub-processing included in the process of updating each variable, and the calculation process of the problem term are not limited.

[Calculation of Algorithm Using Variable Time Step]

In the flowchart of FIG. 6 described above, a fixed value can be used as the time step Δt. However, the time step Δt which is the fixed value is not necessarily used. For example, Δt may be a variable time step. It is possible to realize suppression of calculation time and/or improvement of calculation accuracy by performing calculation of the simulated bifurcation algorithm using the variable time step.

In each iteration of the loop processing, for example, a value of a coefficient t can be updated based on the following (7).

[Formula 7]

$$t_n = t_{n-1} + \Delta t_{n-1} \tag{7}$$

Here, n is a positive integer indicating an iteration number. (7) indicates that a value $t_n$ of the coefficient t in the next iteration n is obtained by adding $\Delta t_{n-1}$ to a value $t_{n-1}$ of the coefficient t in an iteration (n−1). If the variable time step is used, the value of $\Delta t_{n-1}$ is no longer a fixed value in each iteration n=1, 2, and so on. Therefore, $\Delta t_{n-1}$ may take different values depending on iterations.

For example, the coefficient t can be used to determine whether to continue the loop processing. However, the processing of (7) may be skipped in a case where whether to continue the loop processing is determined by another method. For example, whether to continue the loop processing may be determined based on at least one of the value of the Hamiltonian, the value of the coefficient p, the value of the coefficient a, and the number of iterations. That is, the process of updating the coefficient t is not necessarily performed at the time of executing the simulated bifurcation algorithm.

The following (8) represents an example of a method for updating the variable time step.

[Formula 8]

$$\Delta t_n = \Delta t_{n-1}\frac{H'_{n-1}}{H'_{n-1} + (H'_{n-1} - H'_{n-2})} \tag{8}$$

When the method of (8) is used, it is possible to obtain the time step $\Delta t_n$ for the next iteration n by multiplying the time step $\Delta t_{n-1}$ in the iteration (n−1) by coefficients based on Hamiltonian values $H'_{n-1}$ and $H'_{n-2}$. Here, $H'_{n-1}$ is the Hamiltonian value calculated in the iteration (n−1). On the other hand, $H'_{n-2}$ is the Hamiltonian value calculated in the previous iteration (n−2).

When (8) is used, the value of the time step Δt decreases as the Hamiltonian value converges to the vicinity of a constant value (for example, 0) by the loop processing. Therefore, a relatively large time step can be used to reduce the calculation amount before the Hamiltonian value converges. On the other hand, when the convergence of the Hamiltonian value starts, a relatively small time step is used, so that the calculation can be performed with high accuracy. As a result, the approximate solution close to the optimal solution can be calculated. In this manner, the value of the time step may be updated based on the Hamiltonian value calculated by at least one iteration. However, the time step may be updated by a method different from (8).

Figure 7:
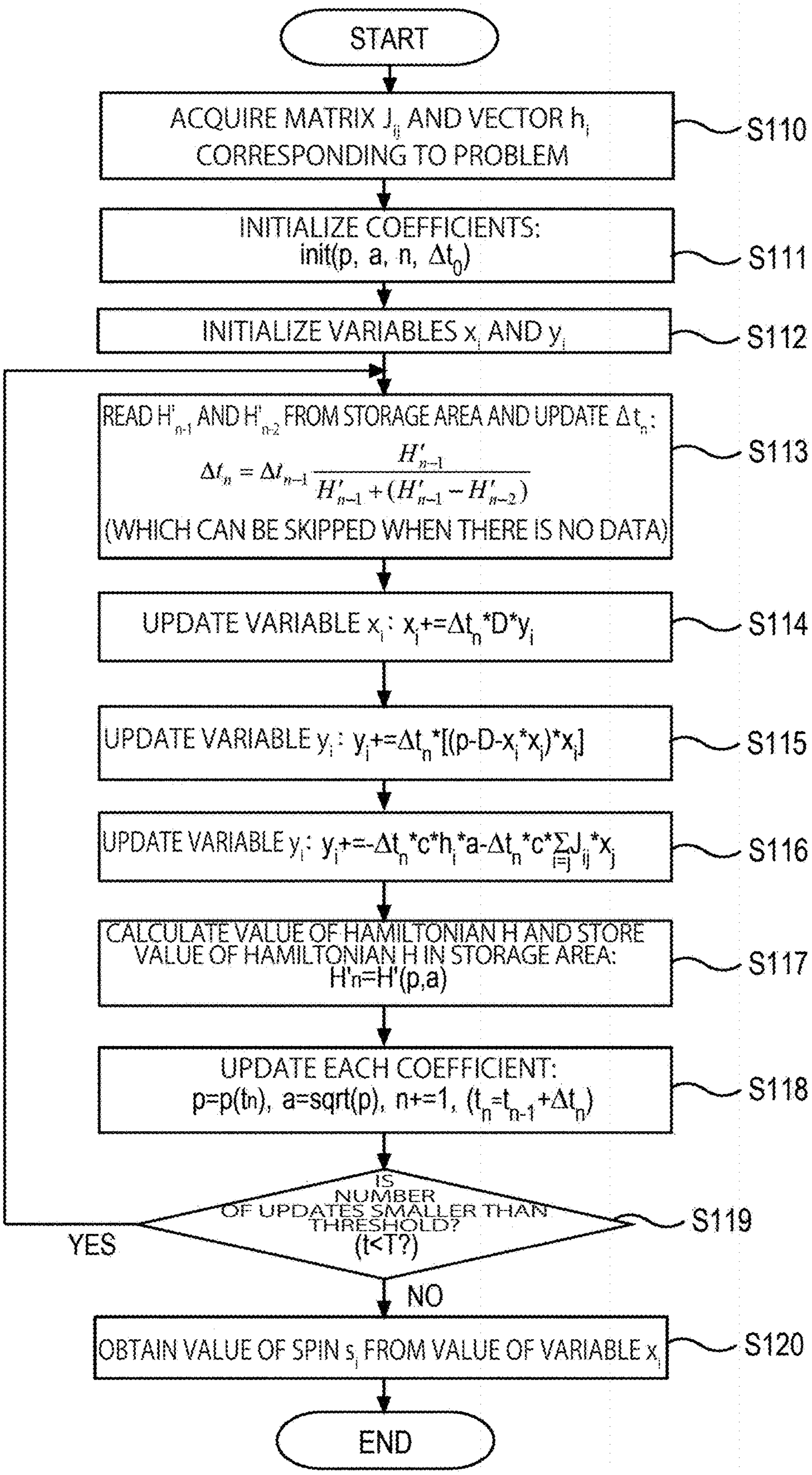
FIG. 7 is a flowchart illustrating an example of an algorithm according to a first modified example.

The flowchart of FIG. 7 illustrates an example of an algorithm according to a first modified example. Hereinafter, processing will be described with reference to FIG. 7.

First, the calculation server acquires the matrix $J_{ij}$ and the vector $h_i$ corresponding to a problem from the management server 1 (step S110). Then, the calculation server initializes coefficients p(t), a(t), n, and $\Delta t_0$ (step S111). For example, values of the coefficients p and a can be set to 0 in step S111, but the initial values of the coefficients p and a are not limited. For example, n can be initialized to 1 in step S111. However, the initial value of n may be different from this. $\Delta t_0$ is an initial value of the time step. For example, the calculation server may set $\Delta t_0$ to any positive natural number.

Then, the calculation server initializes the first variable $x_i$ and the second variable $y_i$ (step S112). Here, the first variable $x_i$ is an element of the first vector. In addition, the second variable $y_i$ is an element of the second vector. In step S112, the calculation server may initialize $x_i$ and $y_i$ to 0, for example. In addition, the calculation server may initialize $x_i$ and $y_i$ using pseudo random numbers, respectively. However, a method for initializing $x_i$ and $y_i$ is not limited. Note that the first variable $x_i$ or the second variable $y_i$ may be initialized at a timing different from this. In addition, initialization of at least one of the variables may be executed a plurality of times.

Next, the calculation server reads the Hamiltonian values $H'_{n-1}$ and $H'_{n-2}$ from a storage area, and updates the time step $\Delta t_n$ (step S113). For example, the time step $\Delta t_n$ can be updated by the above-described method of (8). However, the time step $\Delta t_n$ may be updated by another method. As the storage area, for example, a storage area provided by the shared memory 32 or the storage 34 can be used. However, a storage area provided by an external storage device or a cloud storage may be used, and a location of the storage area is not limited. Note that there is a possibility that $H'_{n-1}$ and $H'_{n-2}$ are not stored in the storage area at a timing when step S113 is executed for the first time. In this case, the process in step S113 may be skipped.

Then, the calculation server updates the element $x_i$ of the corresponding first vector based on the element $y_i$ of the second vector (step S114). For example, the calculation server updates the first vector by performing weighted addition of the element $y_i$ of the corresponding second vector to the element $x_i$ of the first vector in step S114. For example, $\Delta t\times D\times y_i$ can be added to the variable $x_i$ in step S114. Then, the calculation server updates the element $y_i$ of the second vector (steps S115 and S116). For example, $\Delta t\times[(p-D-K\times x_i\times x_i)\times x_i]$ can be added to the variable $y_i$ in step S115. In step S116, $-\Delta t\times c\times h_i\times a-\Delta t\times c\times\Sigma J_{ij}\times x_j$ can be further added to the variable $y_i$.

Next, the calculation server calculates a Hamiltonian value $H'_n$ and stores this in the storage area (step S117). As the Hamiltonian, the above-described energy function in (1) may be calculated. In addition, (3) or (4) described above may be calculated as the Hamiltonian. In addition, a Hamiltonian defined in another format may be used. For example, the calculation server can store the Hamiltonian value $H'_n$ in the storage area together with a number indicating an iteration in which the Hamiltonian is calculated in step S117. Then, the calculation server updates values of the coefficients p, a, and n (step S118). For example, a constant value (Δp) may be added to the coefficient p, and the coefficient a may be set to a positive square root of the updated coefficient p. In addition, the value of the coefficient n may be incremented in step S118. As a result, it is possible to identify an iteration in which data stored in the storage area has been generated. Further, the coefficient $t_0$ may be calculated by adding $\Delta t_n$ to $t_{n-1}$ in step S118.

Next, the calculation server determines whether the number of updates of the first vector and the second vector is smaller than a threshold (step S119). When the number of updates is smaller than the threshold (YES in step S119), the calculation server executes the processes of steps S113 to S118 again. When the number of updates is equal to or larger than the threshold (NO in step S119), the spin $s_i$, which is the element of the solution vector, is obtained based on the element $x_i$ of the first vector (step S120). In step S120, the solution vector can be obtained, for example, in the first vector by converting the variable $x_i$ which is the positive value into +1 and the variable $x_i$ which is the negative value into −1.

Note that when the number of updates is smaller than the threshold in the determination in step S119 (YES in step S119), a value of the Hamiltonian may be calculated based on the first vector, and the first vector and the value of the Hamiltonian may be stored in the storage area. As a result, a user can select an approximate solution closest to the optimal solution from the plurality of first vectors. Then, the selected first vector can be converted into the solution vector. In addition, the solution vector may be calculated at a timing different from this, such as during execution of the loop processing.

In addition, at least one of the processes illustrated in the flowchart of FIG. 7 may be executed in parallel. For example, at least some of the processes of steps S114 to S116 may be executed in parallel such that the N elements included in each of the first vector and the second vector are updated in parallel. For example, the processes may be performed in parallel using a plurality of calculation servers. The processes may be performed in parallel by a plurality of processors. However, an implementation for realizing parallelization of the processes and a mode of the parallelization of the processes are not limited.

The processing circuit of the information processing device may be configured to calculate a value of the Hamiltonian (objective function) based on the first vector and store the value of the Hamiltonian (objective function) in the storage unit. In addition, the processing circuit of the information processing device may be configured to read values of the Hamiltonian (objective function) calculated in different iterations from the storage unit, and update the time step based on the plurality of values of the Hamiltonian (objective function).

[Time-Reversal Symmetric Variable Time Step]

When the variable time step is used at the time of executing the simulated bifurcation algorithm, it is desirable to determine a method for updating the time step Δt in consideration of the influence on the calculation accuracy. For example, when the amount of change in the time step Δt between iterations of the loop processing increases, there is a possibility that the stability of a calculation process is impaired. An example of such a case will be described with reference to FIGS. 8 and 9 below.

Figure 8:
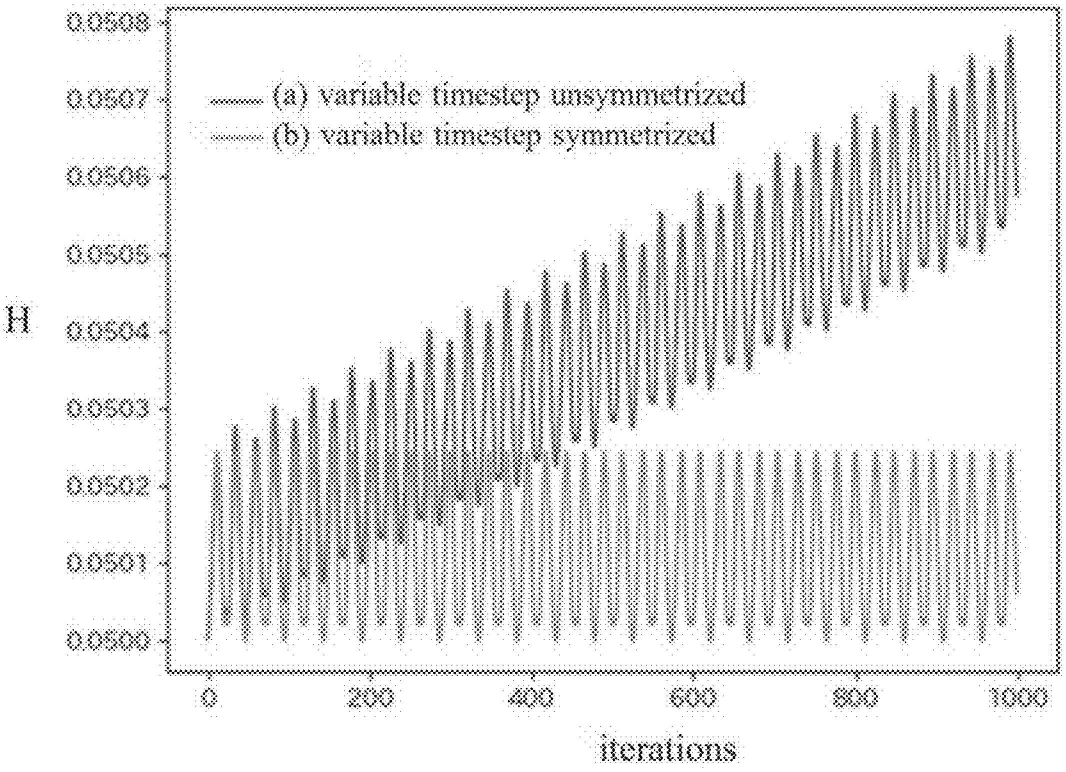
FIG. 8 is a graph illustrating an example of a change in Hamiltonian value according to the number of repetitions (number of iterations) of loop processing of the simulated bifurcation algorithm.

FIG. 8 illustrates an example of a change in the Hamiltonian value according to the number of repetitions (number of iterations) of the loop processing of the simulated bifurcation algorithm. The horizontal axis in FIG. 8 represents the number of iterations of the algorithm. The vertical axis in FIG. 8 represents a value of energy. For example, the energy value is calculated by (1) described above. Meanwhile, an energy function of a format other than (1) may be used.

Figure 9:
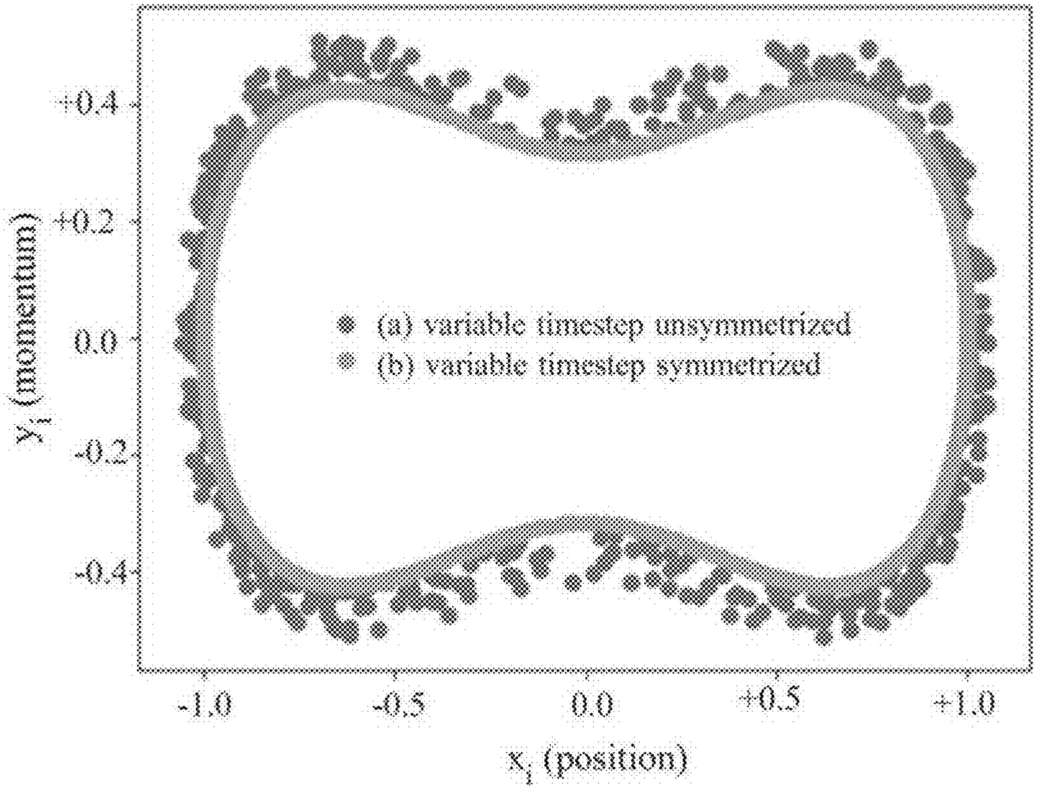
FIG. 9 is a graph illustrating examples of values of a first variable and a second variable in each iteration of the simulated bifurcation algorithm.

FIG. 9 illustrates examples of values of the first variable $x_i$ and the second variable $y_i$ in each iteration of the simulated bifurcation algorithm. The horizontal axis in FIG. 9 corresponds to the value of the first variable $x_i$. On the other hand, the vertical axis in FIG. 9 corresponds to the value of the second variable $y_i$. In a case where the simulated bifurcation algorithm is interpreted as a physical model describing a motion state of a particle, the first variable $x_i$ indicates a position of the particle. On the other hand, the second variable $y_i$ indicates a momentum of the particle.

In FIG. 8 and FIG. 9, (a) illustrates results in a case where the amount of change in the time step Δt is set to be large and the above-described algorithms in (8) and FIG. 7 are executed. Referring to (a) of FIG. 8, the value of energy increases as the number of iterations increases while vibrating. When the simulated bifurcation algorithm satisfies a requirement of a Hamiltonian system, (a) of FIG. 8 can be said to indicate accumulation of calculation errors. In addition, trajectories of the first variable $x_i$ and the second variable $y_i$ change depending on iterations, and an error occurs in (a) of

FIG. 9.

In this manner, when the amount of change in the time step Δt is too large, there is a possibility that it is difficult to enjoy the merit of energy conservation in a case where the Symplectic Euler method is applied to the Hamiltonian system. Therefore, the amount of change in the time step Δt needs to be suppressed within a certain range in order to secure the stability and accuracy of the calculation process in the case of (a) in FIGS. 8 and 9. Therefore, it is likely to be difficult to increase the time step Δt in order to shorten the calculation time.

Although the case where the simulated bifurcation algorithm satisfies the requirement of the Hamiltonian system has been described above, the simulated bifurcation algorithm does not necessarily satisfy the requirement of the Hamiltonian system. Even in a case where an algorithm to be used does not satisfy the requirement of the Hamiltonian system, it is similarly necessary to consider the stability and accuracy of the calculation process.

In the case where the Symplectic Euler method is applied to the Hamiltonian system, the conserved quantity oscillates with respect to a reference point determined depending on the time step Δt. Therefore, when the time step Δt is changed, the reference point of the oscillation changes. Therefore, when the variable time step Δt is not symmetric in a time-reversal manner, there is a possibility that a calculation error is accumulated even if a coefficient such as p does not change depending on the iteration. On the other hand, when the variable time step Δt having the time-reversal symmetry is used, it is possible to return to an initial condition in a solution space by the time reversal, and thus, the accumulation of the calculation error can be prevented.

Therefore, the information processing device and the information processing system can use the time step Δt having the time-reversal symmetry. As a result, the stability and accuracy of the calculation process can be improved. Hereinafter, an example of the variable time step Δt having the time-reversal symmetry will be described.

For example, a time step width $\Delta t_{n,n+1}$ defined in the following (9) can be used.

[Formula 9]

$$\Delta t_{n,n+1} = \frac{\Delta t_{c,n}(x_n, y_n) + \Delta t_{c,n+1}(x_{n+1}, y_{n+1})}{2} \tag{9}$$

Here, $\Delta t_{c,n}$ is a first candidate value of a time step width. On the other hand, $\Delta t_{c,n+1}$ is a second candidate value of the time step width. Both the first candidate value $\Delta t_{c,n}$ and the second candidate value $\Delta t_{c,n+1}$ are calculated based on at least one of the first variable $x_i$ and the second variable $y_i$. Here, n,n+1 in the notation of $\Delta t_{n,n+1}$ indicates a time step width used between an iteration n and an iteration (n+1).

It is necessary to use $\Delta t_{n,n+1}$ in order to calculate the second candidate value $\Delta t_{c,n+1}$ in (9). Therefore, $\Delta t_{n,n+1}$ is defined as an implicit function. Therefore, an implicit solution can be used in the calculation of the time step $\Delta t_{n,n+1}$ satisfying (9). For example, a value of $\Delta t_{n,n+1}$ can be obtained by executing an operation including a repetition so as to obtain a self-consistent implicit function.

The time step width $\Delta t_{n+1,n}$ used between the iteration (n+1) and the iteration n is calculated to be equal to $\Delta t_{n,n+1}$ described above. Since $\Delta t_{n,n+1}=\Delta t_{n+1,n}$ holds, it can be said that the time step width is time-reversal symmetric.

Note that the calculated time step width Δt is an arithmetic mean of the first candidate value $\Delta t_{c,n}$ and the second candidate value $\Delta t_{c,n+1}$ in (9) described above. However, a type of the average operation used for the calculation of the variable time step is not limited. For example, the variable time step may be determined by calculating a geometric mean of the first candidate value $\Delta t_{c,n}$ and the second candidate value $\Delta t_{c,n+1}$. In addition, the variable time step may be obtained by calculating a harmonic mean of the first candidate value $\Delta t_{c,n}$ and the second candidate value $\Delta t_{c,n+1}$.

FIG. 10 illustrates an example of an algorithm for calculating the time-reversal symmetric variable time step using a pseudo code. The pseudo code in FIG. 10 is described using a grammar similar to a general programming language. However, a type of the programming language used to implement the algorithm is not limited. Hereinafter, the example of the algorithm will be described with reference to FIG. 10.

In the upper part of FIG. 10, "a", "b", "dt0", and "thres" are defined as global variables. The global variable is a variable that can also be referred to from the inside of each function. Combinations of the global variables and values of the global variables defined here are merely examples.

Under the global variable, a function "t_evolution" is defined. The function "t_evolution" receives a first variable, a second variable, and a time step as arguments when being called, and returns the first variable and the second variable obtained after time evolution of one iteration. In the function "t_evolution", a process of updating the first variable is executed twice such that the processing becomes time-reversal symmetric. In addition, a process of updating the second variable is executed between the two update processes of the first variable. That is, the time evolution is calculated based on the following algorithm (10) in the example of FIG. 10.

[Formula 10]

$$x\left[n+\frac{1}{2}\right] = x[n] + y[n]\cdot\frac{\Delta t_{n,n+1}}{2} \tag{10}$$

$$y[n+1] = y[n] - \frac{\partial V}{\partial x}\left(x\left[n+\frac{1}{2}\right]\right)\cdot\Delta t_{n,n+1}$$

$$x[n+1] = x\left[n+\frac{1}{2}\right] + y(n+1)\cdot\frac{\Delta t_{n,n+1}}{2}$$

Note that x[n+½] in (10) indicates a value of the first variable after the first update process between the two update processes. Here, the time-reversal symmetry means that a content of processing to be executed does not change even if the execution order of the processing is reversed.

Under the function "t_evolution", a function "generate_dt" is defined. The function "generate_dt" receives a first variable and a second variable as arguments when being called, calculates a candidate value of the time step based on at least one of the first variable and the second variable, and returns the candidate value. As the function "generate_dt" is used, the self-consistent time step can be searched for. As illustrated in the example of FIG. 10, the candidate value (at least one of the first candidate value and the second candidate value) of the time step calculated by the processing circuit may be inversely proportional to a quadratic function of the first variable. For example, as illustrated in FIG. 10, the candidate value of the time step may be calculated based on the global variables "a", "b", and "dt0" and the first variable. However, this calculation method is merely an example. For example, the candidate value of the time step may be calculated based on the second variable. In addition, the candidate value of the time step may be calculated using both the first variable and the second variable. That is, the algorithm used to calculate the second candidate value of the time step is not limited.

Under the function "generate_dt", a function "symmetric_dt" is defined. The function "symmetric_dt" receives a first variable and a second variable as arguments when being called, and returns the first variable and the second variable, and the time step width $\Delta t_{n,n+1}$ that have undergone the time evolution for a plurality of iterations.

Next, details of processing executed by the function "symmetric_dt" will be described.

First, the function "generate_dt" is called twice with a first variable (variable "x1") and a second variable (variable "x2") received at the time of calling the function "symmetric_dt" as arguments. As a result, local variables "dt1" and "dt2" are substituted with candidate values of the time step.

Next, the processing proceeds to for loop processing.

In the for loop, first, the function "t_evolution" is called with the variable "x1", a variable "y1", and (dt1+dt2)/2 as arguments. As a result, the value of the first variable after time evolution for one iteration is substituted for a local variable "x2". In addition, the value of the second variable after time evolution for one iteration is substituted for a local variable "y2". Then, the function "generate_dt" is called using the local variables "x2" and "y2" as arguments, and the generated candidate value of the time step is substituted for the local variable "_dt".

Next, whether a difference between the value of the local variable "dt2" and the value of the local variable "_dt" is smaller than a threshold "thres" is determined in the for loop (if statement). When the difference between the value of the local variable "dt2" and the value of the local variable "_dt" is smaller than the threshold, the loop processing is broken. When the difference between the value of the local variable "dt2" and the value of the local variable "_dt" is equal to or larger than the threshold (else statement), a second candidate value of the time step stored in the local variable "_dt" is substituted for the local variable "dt2". That is, the value of the local variable "dt2" is updated by the else statement.

In the loop processing, the value of (dt1+dt2)/2 changes depending on the iteration. Therefore, the values of the local variables "x2" and "y2" after time evolution change depending on the iteration even if the values of the local variables "x1" and "y1", which are the arguments of the function "t_evolution", do not change. Since the function "generate_dt" performs the calculation using the updated local variables "x2" and "y2", the second candidate value of the time step ("_dt" in FIG. 10) also changes depending on the iteration.

The above-described processing in the for loop is repeated until a value of a counter variable becomes 5 or the determination of the if statement becomes affirmative. That is, the processing in the for loop is repeated until the above-described processing is executed five times or the amount of change in the updated second candidate value ("_dt" in FIG. 10) converges within a certain range. The number of repetitions and the convergence determination in FIG. 10 are merely examples. Therefore, the number of repetitions of the processing in the implicit solution may be a value different from 5. In addition, the threshold used for the convergence determination of the updated second candidate value is not limited.

After breaking the for loop processing, the function "symmetric_dt" returns the value of the local variable "x2", the value of "y2", and the value of (dt1+dt2)/2. The value of the local variable "x2" returned by the function "symmetric_dt" corresponds to the first variable $x_i$ after time evolution. On the other hand, the value of the local variable "y2" returned by the function "symmetric_dt" corresponds to the second variable $y_i$ after time evolution. In addition, the value of (dt1+dt2)/2 returned by the function "symmetric_dt" corresponds to the time step width Δt in (9) described above.

In the lower part of FIG. 10, the above-described function "symmetric_dt" is called with the first variable $x_i$=1 and the second variable $y_i$=0 as arguments. Here, $x_i$=1 and $y_i$=0 are merely examples of values of the arguments at the time of calling the function "symmetric_dt". The first variable $x_i$ and the second variable $y_i$ may take different values depending on an execution status of the simulated bifurcation algorithm.

Note that a global variable "a" in FIG. 10 corresponds to −D+p (t+Δt) in the algorithm of (6) described above. Therefore, a value of the global variable "a" may be updated before or after calling the function "symmetric_dt" in order to monotonically increase or monotonically decrease the second coefficient p depending on the number of updates although not illustrated in the pseudo code of FIG. 10.

Figure 11:
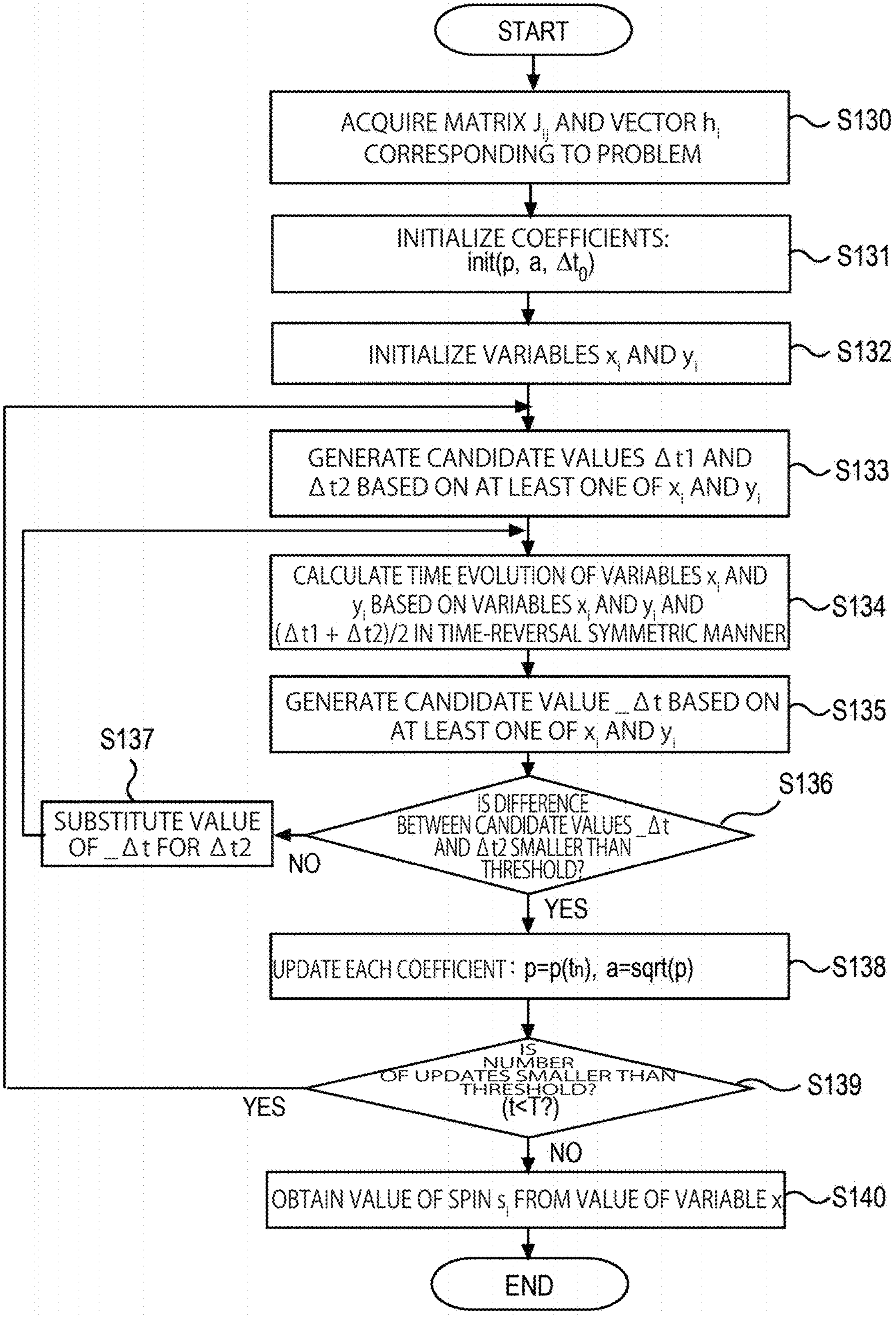
FIG. 11 is a flowchart illustrating an example of an algorithm according to a second modified example.

The flowchart of FIG. 11 illustrates an example of an algorithm according to a second modified example. Hereinafter, processing will be described with reference to FIG. 11.

First, the calculation server acquires the matrix $J_{ij}$ and the vector $h_i$ corresponding to a problem from the management server 1 (step S130). Then, the calculation server initializes coefficients p(t), a(t), and $\Delta t_0$ (step S131). For example, values of the coefficients p and a can be set to 0 in step S131, but the initial values of the coefficients p and a are not limited. Here, $\Delta t_0$ corresponds to the global variable "dt0" in FIG. 10. For example, the calculation server may set $\Delta t_0$ to any positive natural number.

Then, the calculation server initializes the first variable $x_i$ and the second variable $y_i$ (step S132). Here, the first variable $x_i$ is an element of the first vector. In addition, the second variable $y_i$ is an element of the second vector. In step S132, the calculation server may initialize $x_i$ and $y_i$ to 0, for example. In addition, the calculation server may initialize $x_i$ and $y_i$ using pseudo random numbers, respectively. However, a method for initializing $x_i$ and $y_i$ is not limited. In addition, the first variable $x_i$ or the second variable $y_i$ may be initialized at a timing different from this. In addition, at least one of the variables may be initialized a plurality of times.

Next, the calculation server generates candidate values $\Delta t1$ and $\Delta t2$ based on at least one of the first variable $x_i$ and the second variable $y_i$ (step S133). For example, in step S133, the function "generate_dt" in FIG. 10 can be used. However, an algorithm for generating the candidate values $\Delta t1$ and $\Delta t2$ is not limited.

Then, the calculation server calculates time evolution of the first variable $x_i$ and the second variable $y_i$ in a time-reversal symmetric manner based on the first variable $x_i$, the second variable $y_i$, and $(\Delta t1+\Delta t2)/2$ (step S134). Through the process of step S134, the values of the first variable $x_i$ and the second variable $y_i$ are updated. For example, in step S134, the first variable $x_i$ and the second variable $y_i$ can be updated using the above-described (10) or the function "t_evolution" in FIG. 10. However, the first variable $x_i$ and the second variable $y_i$ may be updated using an algorithm different from this as long as the time-reversal symmetry is achieved. Note that a geometric mean of $\Delta t1$ and $\Delta t2$ or a harmonic mean of $\Delta t1$ and $\Delta t2$ may be used in step S134, instead of $(\Delta t1+\Delta t2)/2$. In addition, another average of $\Delta t1$ and $\Delta t2$ may be used in step S134.

Next, the calculation server generates a candidate value_Δt based on at least one of the first variable $x_i$ and the second variable $y_i$ (step S135). Even in step S135, the function "generate_dt" in FIG. 10 can be used. However, the candidate value_Δt may be generated using another algorithm.

Then, the calculation server determines whether a difference between the candidate value_Δt and $\Delta t2$ is smaller than a threshold (step S136). When the difference between the candidate value_Δt and $\Delta t2$ is equal to or larger than the threshold (NO in step S136), the calculation server substitutes the value of _Δt for $\Delta t2$ (step S137). Then, a posting server executes the processes of steps S134 to S136 again. That is, when the determination in step S136 is negative, loop processing on the inner side in FIG. 11 is continued.

When the difference between the candidate value_Δt and $\Delta t2$ is smaller than the threshold (YES in step S136), the calculation server updates values of the coefficients p and a (step S138). For example, a constant value (Δp) may be added to the coefficient p, and the coefficient a may be set to a positive square root of the updated coefficient p. Further, in step S138, the coefficient t may be updated by adding $(\Delta t1+\Delta t2)/2$ to t. Note that a geometric mean of $\Delta t1$ and $\Delta t2$ or a harmonic mean of $\Delta t1$ and $\Delta t2$ may be used in step S138, instead of $(\Delta t1+\Delta t2)/2$. In addition, another average of $\Delta t1$ and $\Delta t2$ may be used in step S138.

Next, the calculation server determines whether the number of updates of the first vector and the second vector is smaller than a threshold (step S139). When the number of updates is smaller than the threshold (YES in step S139), the calculation server executes the processes of step S133 and the subsequent steps again. That is, when the determination in step S139 is affirmative, loop processing on the outer side in FIG. 11 is continued. When the number of updates is equal to or larger than the threshold (NO in step S139), the spin $s_i$, which is the element of the solution vector, is obtained based on the element $x_i$ of the first vector (step S140). In step S140, the solution vector can be obtained, for example, in the first vector by converting the variable $x_i$ which is the positive value into +1 and the variable $x_i$ which is the negative value into −1.

Note that when the number of updates is smaller than the threshold in the determination in step S139 (YES in step S139), a value of the Hamiltonian may be calculated based on the first vector, and the first vector and the value of the Hamiltonian may be stored in the storage area. As a result, a user can select an approximate solution closest to the optimal solution from the plurality of first vectors. In addition, the solution vector may be calculated at a timing different from this, such as during execution of the loop processing.

In addition, at least one of the processes illustrated in the flowchart of FIG. 11 may be executed in parallel. For example, at least some of the processes of steps S133 to S136 may be executed in parallel such that the N elements included in each of the first vector and the second vector are updated in parallel. For example, the processes may be performed in parallel using a plurality of calculation servers. The processes may be performed in parallel by a plurality of processors. However, an implementation for realizing parallelization of the processes and a mode of the parallelization of the processes are not limited.

The processing circuit of the information processing device may be configured to calculate a first candidate value and a second candidate value based on at least one of the first variable and the second variable; update the first variable and the second variable using an average value of the first candidate value and the second candidate value as the time step; update the second candidate value based on at least one of the updated first variable and the updated second variable; and update the first variable and the second variable again using the recalculated average value as the time step.

On the other hand, the processing circuit of the information processing device may be configured to update the second coefficient after a difference between the second candidate value after update and the second candidate value before update is determined to be smaller than a first threshold. In addition, the processing circuit of the information processing device may be configured to update the second coefficient after the number of repetitions of a process of updating the first variable and the second variable using the average value as the time step, a process of updating the second candidate value, and a process of recalculating the average value exceeds a second threshold.

Further, the processing circuit of the information processing device may be configured to execute the process of updating the first variable twice and execute the process of updating the second variable between the first update process of the first variable and the second update process of the first variable. In the first update process of the first variable and the second update process of the first variable in the processing circuit, a value to be added to the first variable may be set to be equal.

In FIGS. 8 and 9, (b) illustrates results in the case of using the time-reversal symmetric variable time step. Referring to (b) of FIG. 8, the energy value oscillates in the vicinity of a constant reference value. Therefore, energy is saved if the simulated bifurcation algorithm satisfies the requirement of the Hamiltonian system. That is, it can be understood that the occurrence of the calculation error is prevented. In addition, (b) of FIG. 9 illustrates that the values of the first variable $x_i$ and the second variable $y_i$ change according to a constant trajectory, and the calculation process is stable.

It is possible to suppress accumulation of errors and to calculate the solution of the combinatorial optimization problem with high accuracy by using the information processing device or the information processing system that uses the time-reversal symmetric variable time step. Since the time step can be set to be large according to a situation by using the variable time step, the calculation time can be shortened without impairing the accuracy and stability of the calculation.

Here, examples of the information processing system, the information processing method, the program, and the storage medium will be described.

The information processing system may include a storage device and an information processing device. The storage device is configured to store, for example, a first variable which is an element of a first vector and a second variable which is an element of a second vector. For example, the information processing device is configured to update the first variable by multiplying the second variable weighted with a first coefficient by a time step and adding the multiplied second variable to the corresponding first variable; update the second variable by weighting the first variable with the time step and a second coefficient, adding the weighted first variable to the corresponding second variable, calculating a problem term using the plurality of first variables, and adding the problem term multiplied by the time step to the second variable; update the time step; and monotonically increase or monotonically decrease the second coefficient depending on the number of updates.

For example, an information processing method repeatedly updates a first vector which has a first variable as an element and a second vector which has a second variable corresponding to the first variable as an element. For example, the information processing method may include: a step of updating the first variable by multiplying the second variable weighted with a first coefficient by a time step and adding the multiplied second variable to the corresponding first variable; a step of updating the second variable by weighting the first variable with the time step and a second coefficient, adding the weighted first variable to the corresponding second variable, calculating a problem term using the plurality of first variables, and adding the problem term multiplied by the time step to the second variable; a step of updating the time step; and a step of monotonically increasing or monotonically decreasing the second coefficient depending on the number of updates.

For example, a program repeatedly updates a first vector which has a first variable as an element and a second vector which has a second variable corresponding to the first variable as an element. For example, the program may cause a computer to execute processing including: a step of updating the first variable by multiplying the second variable weighted with a first coefficient by a time step and adding the multiplied second variable to the corresponding first variable; a step of updating the second variable by weighting the first variable with the time step and a second coefficient, adding the weighted first variable to the corresponding second variable, calculating a problem term using the plurality of first variables, and adding the problem term multiplied by the time step to the second variable; a step of updating the time step; and a step of monotonically increasing or monotonically decreasing the second coefficient depending on the number of updates. In addition, a storage medium may be a non-transitory computer-readable storage medium storing the program.

[Calculation Including Term of Many-Body Interaction]

It is also possible to solve a combinatorial optimization problem having a third-order or higher-order objective function by using the simulated bifurcation algorithm. A problem of obtaining a combination of variables that minimizes the third-order or higher-order objective function, which has a binary variable as a variable, is called a higher-order binary optimization (HOBO) problem. In a case of handling the HOBO problem, the following Formula (11) can be used as an energy formula in an Ising model extended to the higher order.

[Formula 11]

$$E_{HOBO} = \sum_{i=1}^{N} J_i^{(1)} s_i + \frac{1}{2}\sum_{i=1}^{N}\sum_{j=1}^{N} J_{i,j}^{(2)} s_i s_j + \frac{1}{3!}\sum_{i=1}^{N}\sum_{j=1}^{N}\sum_{k=1}^{N} J_{i,j,k}^{(3)} s_i s_j s_k + \dots \qquad (11)$$

Here, $J^{(n)}$ is an n-rank tensor, and is obtained by generalizing the matrix J of the local magnetic field $h_i$ and a coupling coefficient of Formula (1). For example, a tensor $J^{(1)}$ corresponds to a vector of the local magnetic field $h_i$. In the n-rank tensors $J^{(n)}$, when a plurality of indices have the same value, values of elements are 0. Although terms up to a third-order term are illustrated in Formula (11), but a higher-order term can also be defined in the same manner as in Formula (11). Formula (11) corresponds to the energy of the Ising model including a many-body interaction.

Note that both QUBO and HOBO can be said to be a type of polynomial unconstrained binary optimization (PUBO). That is, a combinatorial optimization problem having a second-order objective function in PUBO is QUBO. In addition, it can be said that a combinatorial optimization problem having a third-order or higher-order objective function in PUBO is HOBO.

In a case where the HOBO problem is solved using the simulated bifurcation algorithm, the Hamiltonian H of Formula (3 described above may be replaced with the Hamiltonian H of the following Formula (12).

[Formula 12]

$$H = \sum_{i=1}^{N}\left[\frac{D}{2}(x_i^2 + y_i^2) - \frac{p(t)}{2}x_i^2 + \frac{K}{4}x_i^4 + c\left(J_i^{(1)}x_i\alpha(t) + \frac{1}{2}\sum_{j=1}^{N}J_{i,j}^{(2)}x_ix_j + \frac{1}{3!}\sum_{j=1}^{N}\sum_{k=1}^{N}J_{i,j,k}^{(3)}x_ix_jx_k + \dots\right)\right] \tag{12}$$

$$H_{Ising} = \sum_{i=1}^{N}\left[J_i^{(1)}x_i\alpha(t) + \frac{1}{2}\sum_{j=1}^{N}J_{i,j}^{(2)}x_ix_j + \frac{1}{3!}\sum_{j=1}^{N}\sum_{k=1}^{N}J_{i,j,k}^{(3)}x_ix_jx_k + \dots\right]$$

In addition, a problem term, calculated using a plurality of first variables expressed in the following Formula (13), is derived from Formula (12).

[Formula 13]

$$z_i = \frac{\partial H_{Ising}}{\partial x_i} = J_i^{(1)}\alpha(t) + \sum_{j=1}^{N}J_{i,j}^{(2)}x_j + \sum_{j=1}^{N}\sum_{k=1}^{N}J_{i,j,k}^{(3)}x_jx_k + \dots \tag{13}$$

The problem term $z_i$ of (13) takes a format in which the second expression of (12) is partially differentiated with respect to any variable $x_i$ (element of the first vector). The partially differentiated variable $x_i$ differs depending on an index i. Here, the index i of the variable $x_i$ corresponds to an index designating an element of the first vector and an element of the second vector.

In a case where calculation including the term of the many-body interaction is performed, the recurrence formula of (6) described above is replaced with the following recurrence formula of (14).

[Formula 14]

$$x_i(t+\Delta t) = x_i(t) + Dy_i(t)\Delta t \tag{14}$$

$$y_i(t+\Delta t) = y_i(t) + [\{-D + p^{(m1)}(t+\Delta t) - Kx_i^2\} \propto_i (t+\Delta t)]\Delta t - c\Delta t\left(J_i^{(1)}\alpha(t+\Delta t) + \sum_{j=1}^{N}J_{i,j}^{(2)}x_j(t+\Delta t) + \sum_{j=1}^{N}\sum_{k=1}^{N}J_{i,j,k}^{(3)}x_j(t+\Delta t)x_k(t+\Delta t) + \dots\right)$$

(14) corresponds to a further generalized recurrence formula of (6).

The problem terms described above are merely examples of a problem term that can be used by the information processing device according to the present embodiment. Therefore, a format of the problem term used in the calculation may be different from these. The processing circuit of the information processing device may be configured to calculate the problem term by executing a product-sum operation using a plurality of first variables. Further, the product-sum operation may be divided into a plurality of parts, the respective parts may be assigned to different arithmetic units (processing circuits), and processing may be simultaneously executed by the plurality of arithmetic units. As a result, the product-sum operation can be executed at high speed. In addition, the information processing device may include a plurality of processing circuits. In this case, the respective processing circuits may be configured to execute at least some calculation processes of the problem term in parallel.

[Modified Example of Algorithm]

Here, a modified example of the simulated bifurcation algorithm will be described. For example, various modifications may be made to the above-described simulated bifurcation algorithm for the purpose of reducing an error or reducing a calculation time.

For example, additional processing may be executed at the time of updating a first variable in order to reduce the error in calculation. For example, when an absolute value of the first variable $x_i$ becomes larger than 1 by the update, the value of the first variable $x_i$ is replaced with $sgn(x_i)$. That is, when $x_i>1$ is satisfied by the update, the value of the variable $x_i$ is set to 1. In addition, when $x_i<-1$ is satisfied by the update, the value of the variable $x_i$ is set to −1. As a result, it is possible to approximate the spin $s_i$ with higher accuracy using the variable $x_i$. Since such processing is included, the algorithm is equivalent to a physical model of an N particles having a wall at positions of $x_i=\pm1$. More generally speaking, an arithmetic circuit may be configured to set the first variable, which has a value smaller than a second value, to the second value, and set the first variable, which has a value larger than a first value, to the first value.

Further, when $x_i>1$ is satisfied by the update, the variable $y_i$ corresponding to the variable $x_i$ may be multiplied by a coefficient rf. For example, when the coefficient rf of $-1<r\leq0$ is used, the above wall becomes a wall of the reflection coefficient rf. In particular, when the coefficient rf of rf=0 is used, the algorithm is equivalent to a physics model with a wall causing completely inelastic collisions at positions of $x_i=\pm1$. More generally speaking, the arithmetic circuit may be configured to update a second variable which corresponds to the first variable having a value smaller than the first value or a second variable which corresponds to the first variable larger than the second value, to a value obtained by multiplying the original second variable by a second coefficient. For example, the arithmetic circuit may be configured to update the second variable which corresponds to the first variable having the value smaller than −1 or the second variable which corresponds to the first variable having the value larger than 1, to the value obtained by multiplying the original second variable by the second coefficient. Here, the second coefficient corresponds to the above-described coefficient rf.

Note that the arithmetic circuit may set a value of the variable $y_i$ corresponding to the variable $x_i$ to a pseudo random number when $x_i>1$ is satisfied by the update. For example, a random number in the range of [−0.1, 0.1] can be used. That is, the arithmetic circuit may be configured to set a value of the second variable which corresponds to a first variable having the value smaller than the second value or a value of the second variable which corresponds to the first variable having the value larger than the first value, to the pseudo random number.

If the update process is executed so as to suppress $|x_i|>1$ as described above, the value of $x_i$ does not diverge even if the non-linear term $K\times x_i^2$ in (6) is removed. Therefore, it is possible to use an algorithm illustrated in (15) below.

[Formula 15]

$$x_i(t+\Delta t) = x_i(t) + Dy_i(t)\Delta t \tag{15}$$
$$y_i(t+\Delta t) = y_i(t) + [\{-D + p^{(m1)}(t+\Delta t)\} \propto_i (t+\Delta t)]\Delta t$$
$$-c\Delta t\left(J_i^{(1)}\alpha(t+\Delta t) + \sum_{j=1}^{N} J_{i,j}^{(2)} x_j(t+\Delta t) + \sum_{j=1}^{N}\sum_{k=1}^{N} J_{i,j,k}^{(3)} x_j(t+\Delta t) x_k(t+\Delta t) + \dots\right)$$

In the algorithm of (15), a continuous variable x is used in the problem term instead of a discrete variable. Therefore, there is a possibility that an error from the discrete variable used in the original combinatorial optimization problem occurs. In order to reduce this error, a value sgn(x) obtained by converting the continuous variable x by a signum function can be used instead of the continuous variable x in the calculation of the problem term as in (16) below.

[Formula 16]

$$x_i(t+\Delta t) = x_i(t) + Dy_i(t)\Delta t \tag{16}$$
$$y_i(t+\Delta t) = y_i(t) + \left[\{-D + p^{(m1)}(t+\Delta t)\}x_i(t+\Delta t)\right]\Delta t -$$
$$c\Delta t\left(J_i^{(1)}\alpha(t+\Delta t) + \sum_{j=1}^{N} J_{i,j}^{(2)} \mathrm{sgn}(x_j(t+\Delta t)) + \sum_{j=1}^{N}\sum_{k=1}^{N} J_{i,j,k}^{(3)} \mathrm{sgn}(x_j(t+\Delta t))\mathrm{sgn}(x_k(t+\Delta t)) + \dots\right)$$

In (16), sgn(x) corresponds to the spin s.

In (16), the coefficient a of a term including the first-rank tensor in the problem term may be a constant (for example, $\alpha=1$). In an algorithm of (16), the product of spins appearing in the problem term always takes any value of −1 or 1, and thus, it is possible to prevent the occurrence of an error due to the product operation when the HOMO problem having the higher-order objective function is handled. As in the algorithm of (16) described above, data calculated by the calculation server may further include a spin vector $(s_1, s_2, \dots, s_N)$ having the variable $s_i$ (i=1, 2, . . . , N) as an element. The spin vector can be obtained by converting each element of the first vector by a signum function.

[Example of Parallelization of Variable Update Processes]

Hereinafter, an example of parallelization of variable update processes at the time of calculation of the simulated bifurcation algorithm will be described.

First, an example in which the simulated bifurcation algorithm is implemented in a PC cluster will be described. The PC cluster is a system that connects a plurality of computers and realizes calculation performance that is not obtainable by one computer. For example, the information processing system 100 illustrated in FIG. 1 includes a plurality of calculation servers and processors, and can be used as the PC cluster. For example, the parallel calculation can be executed even in a configuration in which memories are arranged to be distributed in a plurality of calculation servers as in the information processing system 100 by using a message passing interface (MPI) in the PC cluster. For example, the control program 14E of the management server 1, the calculation program 34B and the control program 34C of each of the calculation servers can be implemented using the MPI.

In a case where the number of processors used in the PC cluster is Q, it is possible to cause each of the processors to calculate L variables among the variables $x_i$ included in the first vector $(x_1, x_2, \dots, x_N)$. Similarly, it is possible to cause each of the processors to calculate L variables among the variables $y_i$ included in the second vector $(y_1, y_2, \dots, y_N)$ That is, processors #j (j=1, 2, . . . , Q) calculate variables $\{x_m|m=(j-1)L+1, (j-1)L+2, \dots, jL\}$ and $\{y_m|m=(j-1)L+1, (j-1)L+2, \dots, jL\}$. In addition, a tensor $j^{(n)}$ expressed in the following (17), necessary for the calculation of $\{y_m|m=(j-1)L+1, (j-1)L+2, \dots, jL\}$ by the processors #j, is stored in a storage area (for example, a register, a cache, a memory, or the like) accessible by the processors #j.

[Formula 17]

$$\{J_m^{(1)}|m=(i-1)L+1, \dots iL\} \tag{17}$$
$$\{J_{m,j}^{(2)}|m=(i-1)L+1, \dots iL; j=1, \dots N\}$$
$$\{J_{m,j,k}^{(3)}|m=(i-1)L+1, \dots iL; j=1, \dots N; k=1, \dots N\},$$

Here, the case where each of the processors calculates the constant number of variables of each of the first vector and the second vector has been described. However, the number of elements (variables) of each of the first vector and the second vector to be calculated may be different depending on a processor. For example, in a case where there is a performance difference depending on a processor implemented in a calculation server, the number of variables to be calculated can be determined depending on the performance of the processor.

Values of all the components of the first vector $(x_1, x_2, \dots, x_N)$ are required in order to update the value of the variable $y_i$. The conversion into a binary variable can be performed, for example, by using the signum function sgn( ). Therefore, the values of all the components of the first vector $(x_1, x_2, \dots, x_N)$ can be shared by the Q processors using the Allgather function. Although it is necessary to share the values between the processors regarding the first vector $(x_1, x_2, \dots, x_N)$, but it is not essential to share values between the processors regarding the second vector $(y_i, y_2, \dots, y_N)$ and the tensor $J^{(n)}$. The sharing of data between the processors can be realized, for example, by using inter-processor communication or by storing data in a shared memory.

The processor #j calculates a value of the problem term $\{z_m|m=(j-1)L+1, (j-1)L+2, \dots, jL\}$. Then, the processor #j updates the variable $\{y_m|m=(j-1)L+1, (j-1)L+2, \dots, jL\}$ based on the calculated value of the problem term $\{\{z_m|m=(j-1)L+1, (j-1)L+2, \dots, jL\}$.

As illustrated in the above-described respective formulas, the calculation of the vector $(z_1, z_2, \dots, z_N)$ of the problem term requires the product-sum operation including the calculation of the product of the tensor J(n) and the vector $(x_1, x_2, \dots, x_N)$. The product-sum operation is processing with the largest calculation amount in the above-described algorithm, and can be a bottleneck in improving the calculation speed. Therefore, the product-sum operation is distributed to Q=N/L processors and executed in parallel in the implementation of the PC cluster, so that the calculation time can be shortened.

Figure 12:
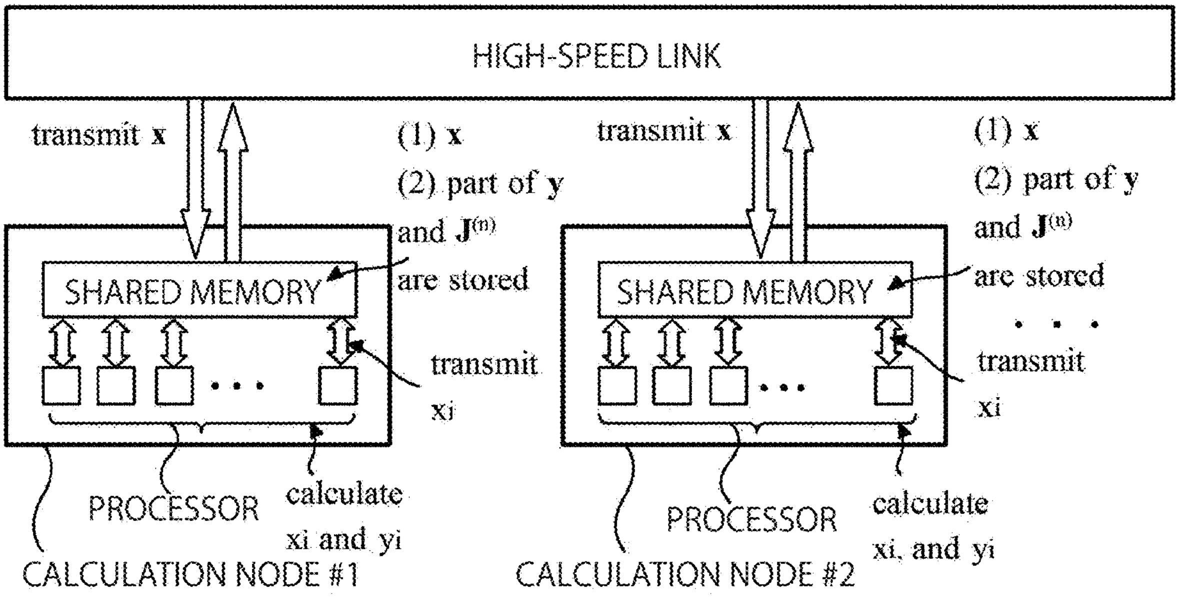
FIG. 12 is a diagram schematically illustrating an example of a multi-processor configuration.

FIG. 12 schematically illustrates an example of a multiprocessor configuration. A plurality of calculation nodes in FIG. 12 correspond to, for example, the plurality of calculation servers of the information processing system 100. In addition, a high-speed link of FIG. 12 corresponds to, for example, the interconnection between the calculation servers formed by the cables 4_a_ to 4_c_ and the switch 5 of the information processing system 100. A shared memory in FIG. 12 corresponds to, for example, the shared memory 32. Processors in FIG. 12 correspond to, for example, the processors 33A to 33D of the respective calculation servers. Note that FIG. 12 illustrates the plurality of calculation nodes, but the use of a configuration of a single calculation node is not precluded.

FIG. 12 illustrates data arranged in each of components and data transferred between the components. In each of the processors, values of the variables $x_i$ and $y_i$ are calculated. In addition, the variable $x_i$ is transferred between the processor and the shared memory. In the shared memory of each of the calculation nodes, for example, the first vector $(x_1, x_2, \ldots, x_N)$), L variables of the second vector $(y_i, y_2, \ldots, y_N)$, and some of the tensors $J^{(n)}$ are stored. Then, for example, the first vector $(x_1, x_2, \ldots, x_N)$ is transferred in the high-speed link connecting the calculation nodes. In a case where the Allgather function is used, all elements of the first vector $(x_1, x_2, \ldots, x_N)$ are required in order to update the variable $y_i$ in each of the processors.

Note that the arrangement and transfer of data illustrated in FIG. 12 are merely examples. A data arrangement method, a transfer method, and a parallelization method in the PC cluster are not particularly limited.

In addition, the simulated bifurcation algorithm may be calculated using a graphics processing unit (GPU).

Figure 13:
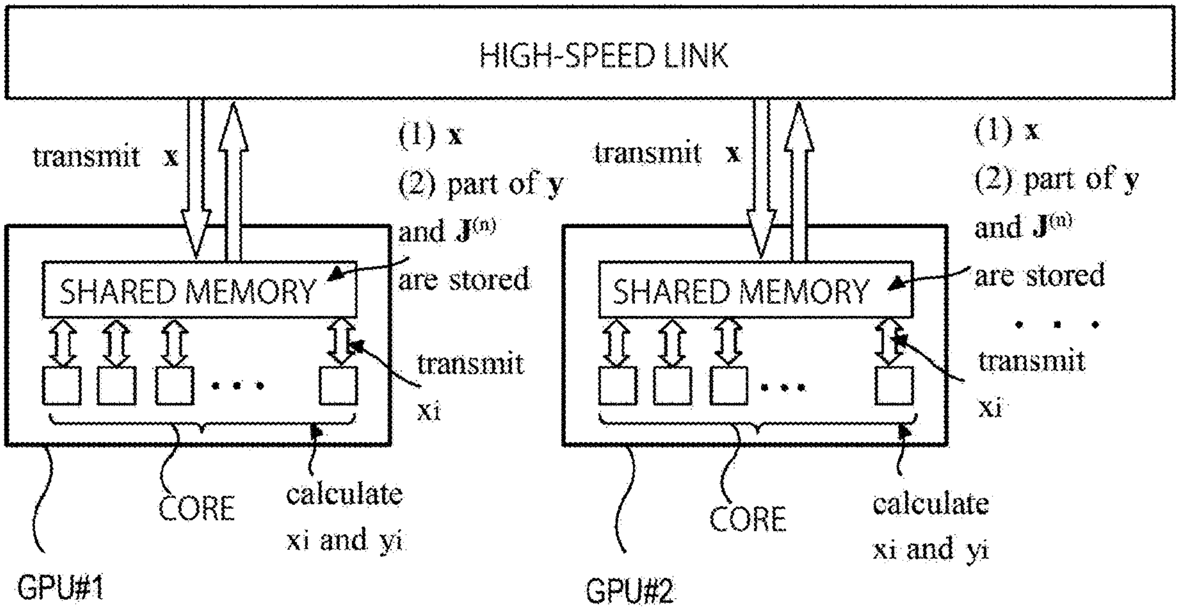
FIG. 13 is a diagram schematically illustrating an example of a configuration using a GPU.

FIG. 13 schematically illustrates an example of a configuration using the GPU. FIG. 13 illustrates a plurality of GPUs connected to each other by a high-speed link. Each GPU is equipped with a plurality of cores capable of accessing a shared memory. In addition, the plurality of GPUs are connected via the high-speed link to form a GPU cluster in the configuration example of FIG. 13. For example, if the GPUs are mounted on the respective calculation servers in FIG. 1, the high-speed link corresponds to the interconnection between the calculation servers formed by the cables 4_a_ to 4_c_ and the switch 5. Note that the plurality of GPUs are used in the configuration example of FIG. 13, but parallel calculation can be executed even in a case where one GPU is used. That is, each of the GPUs of FIG. 13 may perform the calculation corresponding to each of the calculation nodes of FIG. 16. That is, the processor (processing circuit) of the information processing device (calculation server) may be a core of the graphics processing unit (GPU).

In the GPU, the variables $x_i$ and $y_i$ and the tensor $J^{(n)}$ are defined as device variables. The GPUs can calculate the product of the tensor $J^{(n)}$ necessary to update the variable $y_i$ and the first vector $(x_1, x_2, \ldots, x_N)$ in parallel by a matrix vector product function. Note that the product of the tensor and the vector can be obtained by repeatedly executing the matrix vector product operation. In addition, it is possible to parallelize the processes by causing each thread to execute a process of updating the i-th element $(x_i, y_i)$ for a portion other than the product-sum operation in the calculation of the first vector $(x_1, x_2, \ldots, x_N)$ and the second vector $(y_i, y_2, \ldots, y_N)$.

The information processing device may include a plurality of processing circuits. In this case, the respective processing circuits may be configured to update at least a part of the first vector and at least a part of the second vector in parallel.

In addition, the information processing system may include a plurality of the information processing devices. In this case, the respective processing circuits may be configured to update at least a part of the first vector and at least a part of the second vector in parallel.

[Overall Processing for Solving Combinatorial Optimization Problem]

The following describes overall processing executed to solve a combinatorial optimization problem using the simulated bifurcation algorithm.

Figure 14:
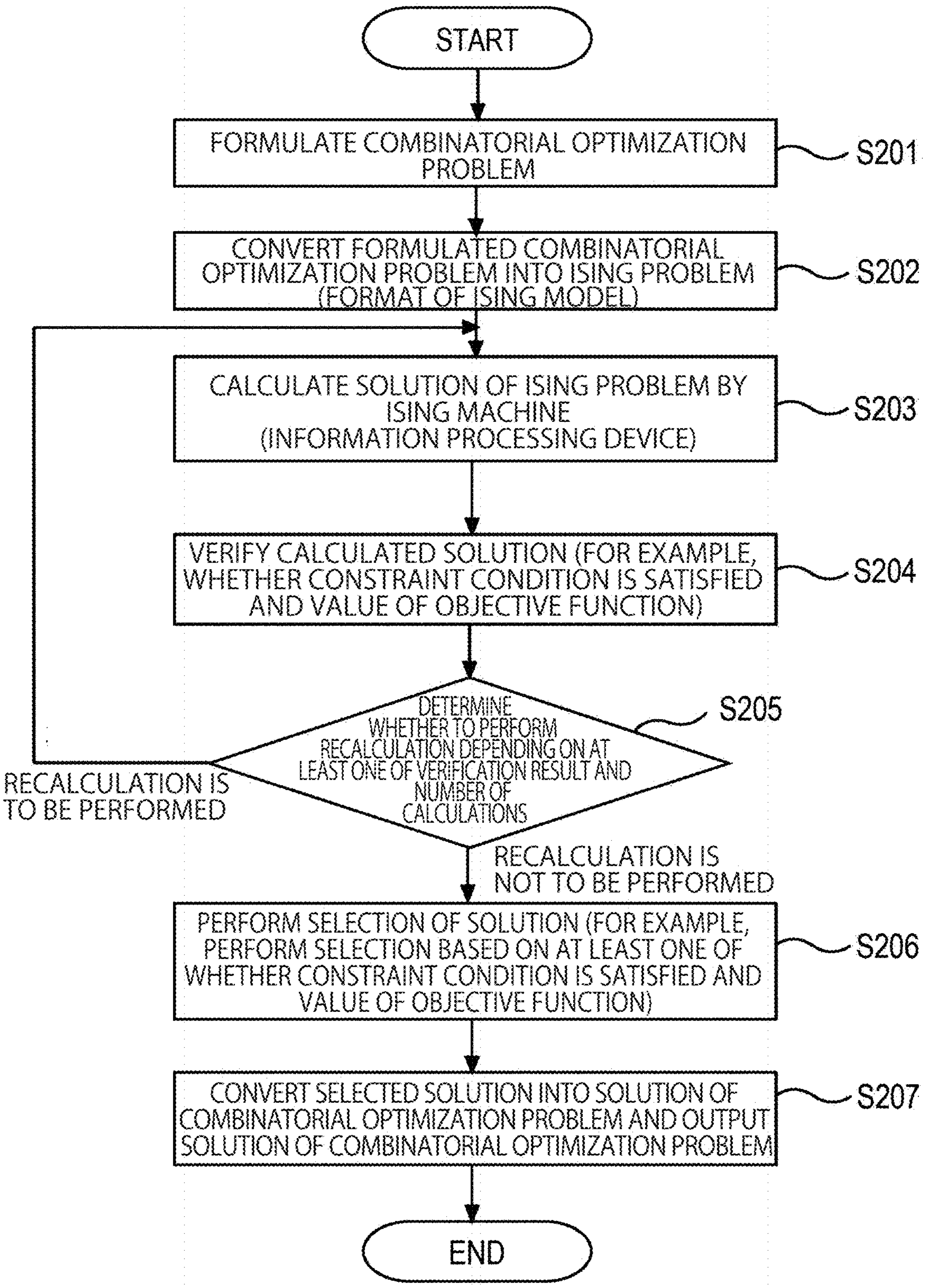
FIG. 14 is a flowchart illustrating an example of overall processing executed to solve a combinatorial optimization problem.

A flowchart of FIG. 14 illustrates an example of the overall processing executed to solve the combinatorial optimization problem. Hereinafter, processing will be described with reference to FIG. 14.

First, the combinatorial optimization problem is formulated (step S201). Then, the formulated combinatorial optimization problem is converted into an Ising problem (a format of an Ising model) (step S202). Next, a solution of the Ising problem is calculated by an Ising machine (information processing device) (step S203). Then, the calculated solution is verified (step S204). For example, in step S204, whether a constraint condition has been satisfied is confirmed. In addition, whether the obtained solution is an optimal solution or an approximate solution close thereto may be confirmed by referring to a value of an objective function in step S204.

Then, it is determined whether recalculation is to be performed depending on at least one of the verification result or the number of calculations in step S204 (step S205). When it is determined that the recalculation is to be performed (YES in step S205), the processes in steps S203 and S204 are executed again. On the other hand, when it is determined that the recalculation is not to be performed (NO in step S205), a solution is selected (step S206). For example, in step S206, the selection can be performed based on at least one of whether the constraint condition is satisfied or the value of the objective function. Note that the process of step S206 may be skipped when a plurality of solutions are not calculated. Finally, the selected solution is converted into a solution of the combinatorial optimization problem, and the solution of the combinatorial optimization problem is output (step S207).

When the information processing device, the information processing system, the information processing method, the storage medium, and the program described above are used, the solution of the combinatorial optimization problem can be calculated within the practical time. As a result, it becomes easier to solve the combinatorial optimization problem, and it is possible to promote social innovation and progress in science and technology.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device comprising:

a host bus adapter;

a shared memory configured to store a plurality of first variables which are elements of a first vector and a subset of second variables among a plurality of second variables which are corresponding elements of a second vector, wherein the number of first variables in the plurality of first variables is the same as the number of second variables in the plurality of second variables; and a plurality of processing circuits connected to the shared memory via a bus, each of the processing circuits being configured to:

retrieve the plurality of first variables and the subset of second variables from the shared memory, update a subset of first variables from among the plurality of first variables by multiplying the subset of second variables weighted with a first coefficient by a time step, and adding the multiplied subset of second variables to the subset of first variables, wherein the subset of first variables respectively correspond to the subset of second variables, update the subset of second variables by weighting the subset of first variables with the time step and a second coefficient, adding the weighted subset of first variables to the subset of second variables, wherein the subset of second variables respectively correspond to the subset of first variables, calculating a problem term using the first variables, and adding the problem term multiplied by the time step to the subset of second variables, update the time step, and monotonically increase or monotonically decrease the second coefficient depending on a number of updates, wherein the respective processing circuits are configured to update at least a part of the first vector and at least a part of the second vector in parallel, the information processing device is configured to transfer the plurality of first variables after the update via the host bus adapter, and the plurality of processing circuits are forming a cluster of processors in a computer cluster and configured to communicate using a message passing interface (MPI), the computer cluster being configured to realize calculation performance that is not attainable by one computer.

2. The information processing device according to claim 1, wherein in the updating of the time step, each one of the processing circuits is configured to:

calculate a first candidate value and a second candidate value based on at least one of the first variables and the second variables;

calculate an average value of the first candidate value and the second candidate value; and after updating the time step, each one of the processing circuits is further configured to:

update the first variables and the second variables using the average value of the first candidate value and the second candidate value as the time step to obtain further updated first variables and further updated second variables;

update the second candidate value based on at least one of the further updated first variables and the further updated second variables;

recalculate the average value of the first candidate value and the updated second candidate value; and update the further updated first variables and the further updated second variables again using the recalculated average value as the time step.

3. The information processing device according to claim 2, wherein at least one of the first candidate value and the second candidate value calculated by each one of the processing circuits is inversely proportional to a quadratic function of the first variables.

4. The information processing device according to claim 2, wherein each one of the processing circuits is further configured to update the second coefficient after a difference between the second candidate value after updating the second candidate value based on at least one of the further updated first variables and the further updated second variables and the second candidate value before updating the second candidate value based on at least one of the further updated first variables and the further updated second variables is determined to be smaller than a first threshold.

5. The information processing device according to claim 2, wherein each one of the processing circuits is further configured to update the second coefficient after a number of repetitions of a process of updating the first variables and the second variables using the average value of the first candidate value and the second candidate value as the time step, a process of updating the second candidate value, and a process of recalculating the average value exceeds a second threshold.

6. The information processing device according to claim 2, wherein the updating of the first variables using the average value of the first candidate value and the second candidate value as the time step is a first update process of the first variables, the updating of the further updated first variables again using the recalculated average value as the time step is a second update process of the first variables, and the updating of the second variable executed between the first update process of the first variables and the second update process of the first variables.

7. The information processing device according to claim 6, wherein a value to be added to the first variables is set to be equal in the first update process and the second update process in each one of the processing circuits.

8. The information processing device according to claim 1, wherein each one of the processing circuits is further configured to calculate a value of an objective function based on the first vector, and store the value of the objective function in the shared memory.

9. The information processing device according to claim 8, wherein in the updating of the time step, each one of the processing circuits is further configured to read values of the objective function calculated in different iterations from the shared memory, and update the time step based on a plurality of the values of objective function.

10. The information processing device according to claim 1, wherein the problem term calculated by each one of the processing circuits is based on an Ising model.

11. The information processing device according to claim 10, wherein
the problem term calculated by each one of the processing circuits includes many-body interaction.

12. The information processing device according to claim 1, wherein
each of the processing circuits is configured to execute at least some calculation processes of the problem term in parallel.

13. The information processing device according to claim 1, wherein the number of second variables corresponding to each of the processing circuits is determined based upon the performance of the corresponding processing circuit.

14. An information processing system comprising:
a management server configured to convert a combinatorial optimization problem into a format that can be processed by a plurality of information processing devices, and transmit the converted problem to the plurality of information processing devices via a network; and
the plurality of information processing devices forming a cluster of processors in a computer cluster and configured to communicate using a message passing interface (MPI), the computer cluster being configured to realize calculation performance that is not attainable by one computer, each one of the information processing devices including:
a host bus adapter;
a shared memory configured to store a plurality of first variables which are elements of a first vector and a subset of second variables among a plurality of second variables which are corresponding elements of a second vector, wherein the number of first variables in the plurality of first variables is the same as the number of second variables in the plurality of second variables; and
a plurality of processing circuits connected to the shared memory via a bus, each of the processing circuits being configured to
retrieve the plurality of first variables and the subset of second variables from the shared memory,
update a subset of first variables from among the plurality of first variables by
multiplying the subset of second variables weighted with a first coefficient by a time step, and
adding the multiplied subset of second variables to the subset of first variables, wherein the subset of first variables respectively correspond to the subset of second variables,
update the subset of second variables by
weighting the subset of first variables with the time step and a second coefficient,
adding the weighted subset of first variables to the subset of second variables, wherein the subset of second variables respectively correspond to the subset of first variables,
calculating a problem term using the plurality of first variables, and
adding the problem term multiplied by the time step to the subset of second variables,
update the time step, and
monotonically increase or monotonically decrease the second coefficient depending on a number of updates,
wherein
the respective processing circuits are configured to update at least a part of the first vector and at least a part of the second vector in parallel,
the management server is further configured to acquire calculation results from the plurality of information processing devices, aggregate the calculation results, and convert the aggregated calculation result into a solution of the combinatorial optimization problem, and
each of the plurality of information processing devices is configured to transfer the plurality of first variables via the host bus adapter after the update.

15. The information processing system according to claim 14, wherein the number of second variables corresponding to each of the processing circuits is determined based upon the performance of the corresponding processing circuit.

16. An information processing method for repeatedly updating a first vector, which has a plurality of first variables as its elements, and a second vector, which has a plurality of second variables corresponding to the plurality of first variables as its elements, the information processing method comprising performing a processing procedure by each one of a plurality of processing circuits of each one of a plurality of information processing devices, the processing procedure comprising:
retrieving the plurality of first variables and a subset of second variables from among the plurality of second variables from a memory shared by the plurality of processing circuits;
updating a subset of first variables from among the plurality of first variables by
multiplying the subset of second variables weighted with a first coefficient by a time step, and
adding the multiplied subset of second variables to the subset of first variables, wherein the subset of first variables respectively correspond to the subset of second variables;
updating the subset of second variables by
weighting the subset of first variables with the time step and a second coefficient,
adding the weighted subset of first variables to the subset of second variables, wherein the subset of second variables respectively correspond to the subset of first variables,
calculating a problem term using the plurality of first variables, and
adding the problem term multiplied by the time step to the subset of second variables;
updating the time step; and
monotonically increasing or monotonically decreasing the second coefficient depending on a number of updates,
wherein
the respective information processing devices are configured to update at least a part of the first vector and at least a part of the second vector in parallel, and
each of the plurality of information processing devices is configured to transfer the plurality of first variables after the update via a host bus adapter, and
the plurality of information processing devices forming a cluster of processors in a computer cluster and configured to communicate using a message passing interface (MPI), the computer cluster being configured to realize calculation performance that is not attainable by one computer.

17. The information processing method according to claim 16, wherein the number of second variables corresponding to each of the processing circuits is determined based upon the performance of the corresponding processing circuit.

18. A non-transitory computer-readable storage medium storing a program for causing each one of a plurality of processing circuits of each one of a plurality of information processing devices to repeatedly update a first vector, which has a plurality of first variables as its element, and a second vector, which has a plurality of second variables corresponding to the plurality of first variables as its elements, the program causing each one of the processing circuits of the plurality of information processing devices to execute processing comprising:

retrieving the plurality of first variables and L second variables from among the plurality of second variables from a shared memory;

updating a subset of first variables from among the plurality of first variables by multiplying the subset of second variables weighted with a first coefficient by a time step, and adding the multiplied subset of second variables to the subset of first variables, wherein the subset of first variables respectively correspond to the subset of second variables;

updating the subset of second variables by weighting the subset of first variables with the time step and a second coefficient, adding the weighted subset of first variables to the subset of second variables, wherein the subset of second variables respectively correspond to the subset of first variables, calculating a problem term using the plurality of first variables, and adding the problem term multiplied by the time step to the subset of second variables;

updating the time step; and monotonically increasing or monotonically decreasing the second coefficient depending on a number of updates, wherein the program causes the processing circuits of the plurality of information processing devices to update at least a part of the first vector and at least a part of the second vector in parallel, and each one the plurality of information processing devices is configured to transfer the plurality of first variables after the update via a host bus adapter, and the plurality of information processing devices forming a cluster of processors in a computer cluster and configured to communicate using a message passing interface (MPI), the computer cluster being configured to realize calculation performance that is not attainable by one computer.

19. The non-transitory computer-readable storage medium according to claim 18, wherein the number of second variables corresponding to each of the processing circuits is determined based upon the performance of the corresponding processing circuit.

* * * * *